US011024105B1

(12) United States Patent
Brand et al.

(10) Patent No.: US 11,024,105 B1
(45) Date of Patent: Jun. 1, 2021

(54) SAFETY AND SECURITY METHODS AND SYSTEMS

(71) Applicant: CYBRA CORPORATION, Yonkers, NY (US)

(72) Inventors: Harold Brand, Bronx, NY (US); Benni Jakubovic, West Orange, NJ (US)

(73) Assignee: CYBRA CORPORATION, Yonkers, NY (US)

( * ) Notice: Subject to any disclaimer, the term of this patent is extended or adjusted under 35 U.S.C. 154(b) by 0 days.

(21) Appl. No.: 16/161,792

(22) Filed: Oct. 16, 2018

Related U.S. Application Data

(60) Provisional application No. 62/573,022, filed on Oct. 16, 2017.

(51) Int. Cl.
*G07C 9/28* (2020.01)
*G06K 7/10* (2006.01)

(52) U.S. Cl.
CPC .......... *G07C 9/28* (2020.01); *G06K 7/10366* (2013.01)

(58) Field of Classification Search
CPC .............................. G07C 9/28; G06K 7/10366
See application file for complete search history.

(56) References Cited

U.S. PATENT DOCUMENTS 5,960,085 A * 9/1999 de la Huerga ......... G16H 10/60
340/5.61
6,549,130 B1 4/2003 Joao
(Continued)

FOREIGN PATENT DOCUMENTS

DE 102011076004 A1 * 11/2012 ............... G07C 9/10

OTHER PUBLICATIONS

CYBRA Corporation, CYBRACare RTS Long Term Care Resident Tracking System; www.cybra.com.
(Continued)

*Primary Examiner* — Sonji N Johnson
(74) *Attorney, Agent, or Firm* — Gottlieb, Rackman & Reisman, P.C.

(57) ABSTRACT

A method and system for securing access to a facility without slowing access by authorized persons in a group or continuous stream of entry. Individuals at the facility are assigned security badges with badge IDs that can be read from a remote reader. A reader is positioned to read a set of security badges within a predefined area relative to an electronically controlled entry barrier that can be engaged or disengaged. The set of detected badge IDs in the area is sent to a computer. The computer determines using one or more predefined rules whether access is permitted for all of the individuals assigned to the detected badges. If all individuals are permitted access, a signal is sent to disengage the barrier. If at least one individual in the set is not permitted access, the barrier remains engaged and an access denied message is sent to a receiver. The access denied message can indicate a condition for denying access such as presence of a specific unauthorized individual in the predefined area. The receiver can be an audio or visual display in the facility or contained within an ID badge, such as one worn by the unauthorized individual. Access to the facility can be granted when the system detects the unauthorized individual is outside the predefined area.

35 Claims, 25 Drawing Sheets

(56) References Cited

U.S. PATENT DOCUMENTS

| | | | |
|---|---|---|---|
| 6,801,640 B1* | 10/2004 | Okubo | G07C 9/00 |
| | | | 382/118 |
| 6,847,892 B2 | 1/2005 | Zhou et al. | |
| 6,850,839 B1 | 2/2005 | McGibney | |
| 7,482,920 B2 | 1/2009 | Joao | |
| RE43,178 E | 2/2012 | Ghazarian | |
| 8,149,113 B2 | 4/2012 | Diem | |
| 8,952,786 B1 | 2/2015 | Steege et al. | |
| 9,355,508 B2 | 5/2016 | Prasad et al. | |
| 2004/0149822 A1* | 8/2004 | Stevens | G07C 9/28 |
| | | | 235/385 |
| 2005/0248444 A1 | 11/2005 | Joao | |
| 2008/0074256 A1* | 3/2008 | Hirai | G08B 13/196 |
| | | | 340/541 |
| 2010/0259611 A1* | 10/2010 | Keshavarzian | G08B 13/2462 |
| | | | 348/143 |
| 2014/0375454 A1* | 12/2014 | Konrad | G08B 13/248 |
| | | | 340/552 |
| 2015/0158696 A1* | 6/2015 | Miyajima | B66B 1/2408 |
| | | | 187/381 |
| 2016/0368732 A1* | 12/2016 | Zhao | B66B 1/3476 |

OTHER PUBLICATIONS

CYBRA Corporation, EdgeMagic™HTS; www.cybra.com.
CYBRA Corporation, EdgeMagic® CL RFID Closed Loop Application System; www.cybra.com.
CYBRA Corporation, EdgeBox Controller High Performance, Zero Maintenance Server; www.cybra.com.

* cited by examiner

Confirm the alert issued

Alert type: prohibited area entered
Location: room 1101

Date: 11:15 am (7/20/2016)
Employee: JOHN SMITH

Information | Live video feed

JOHN SMITH has entered an unauthorized area. if qualified, please proceed with the following operator checklist
JOHN SMITH checklist Operator checklist
☐ Call staff
☐ Call area supervisor

[Proceed]

[False alarm]

Other alerts ▾

SAFETY AND SECURITY METHODS AND SYSTEMS

CROSS REFERENCE TO RELATED APPLICATIONS

This application claim priority to U.S. Provisional Application No. 62/573,022, filed on Oct. 16, 2017, the entire contents of which is expressly incorporated by reference.

FIELD OF THE INVENTION

The present invention relates to methods and systems for monitoring individuals in connection with automated enforcement of safety and security conditions, including in connection with lone worker situations and access to restricted facilities.

BACKGROUND

Monitoring employees, visitors and outside contractors—both welcome and not—at a facility is a challenging task. Certain areas may be restricted to visitors and particular employees. Other areas may require that an individual be escorted by authorized personnel before allowing to enter and for the person to remain accompanied by an authorized individual while in restricted areas. Likewise, the presence of or participation by authorized personnel may be a requirement for the operation of certain machinery or engaging in other activities. These restrictions and rules are generally implemented for safety, security, or confidentiality reasons and significant time and resources can be expended in their enforcement.

There are many instances where an individual may be assigned to perform a task, such as inspecting a remote location. So-called "lone worker" conditions raise safety and other concerns. The age-old solution is the "buddy system" where employees perform their tasks in the presence of one or more additional employees who are not needed for the tasks at hand. Rather, the extra employees are there to watch in case there is an accident or other emergency and then render aid or call for help when required. There are several drawbacks to this approach. Labor costs are increased and can be doubled or more because of the additionally needed personnel. In addition, if there is a safety threat that impacts both the worker and monitoring employees or a larger scale threat, there may be nobody available to quickly render aid or reach out for assistance to be sent to the scene.

In various cases, the employer simply accepts the risk of a lone employee situation. Where lone employees are deployed, current solutions to respond to accidents use mobile phones and push-to-talk devices to provide voice communication. Some devices can be fitted with a prominent "Panic Button" that can be pressed in an emergency. Fixed location (wall-mounted) panic button systems are also on the market. However, there can be situations where an accident renders the employee unable to access their phone or press the panic button. There are solutions in which accelerometers (such as in a mobile cellular device) can be monitored to trigger an alert when an impact or lack of motion is detected. However, these conventional solutions suffer from reliability issues and spotty coverage or lack of coverage in areas such as suburban and rural areas, basements and reinforced concrete buildings. Detection performance can also be inadequate and result in both false positives and false negatives.

More generally, various locating techniques have been used to track individuals. Cellular GPS units are used for tracking of items or people that are outdoors. Inside of buildings and other enclosed spaces, systems can track electronic badges that include RFID tags or transmitters to determine where an individual is. However, these systems are not adapted to address issues of employee and visitor safety and security.

The various systems currently available on the market also lack flexibility, reliability, and do not provide seamless monitoring that spans environments where work is performed in diverse geographic regions and structural environments, such as inside of a building, outside on nearby grounds, while in route, and where employees are required to travel to and work in distant locations. In these types of situations, the data received from remote GPS and other sensors can vary as the individual moves around. Signals can be lost for some or all the data streams intermittently or for extended periods and at different periods of time. While multiple different monitoring systems can be used, each designed to operate in a specific environment, and for different monitoring applications, this adds cost and increases complexity of operation, maintenance, and coordination systems. The result is that systems complexity and cost increase, while reliability suffers.

There is therefore a need to provide improved monitoring systems and methods to enforce restrictions on where individuals can travel in a facility with or without accompaniment and on the operation of various equipment with and without supervision. There is a further need to provide improved methods and systems for increasing safety and emergency detection and response for lone worker environments, such as fall detection and alert management and response within an organization. There is a further need to integrate tag-based employee monitoring systems with other security systems to simplify security monitoring and response.

SUMMARY

These and other issues are addressed with the safety, security, monitoring, and response systems and methods described herein.

The system works with ID tags (also referred to as badges herein) and asset tags that include various sensor functions. Employees can be provided with customized active RFID badges that include a customized suite of sensors and at least some limited processing capabilities. The badges can be programmed to detect and automatically respond to various conditions. In one configuration, an active ID badge (also referred to as a tag) comprises a 3-axis electronic accelerometer, a mechanical accelerometer, an Inertial Measurement Unit (IMU), altimeter, thermocouple, and a panic button switch. Circuitry in the badge can monitor the sensors and panic button and transmit data to the system about the measured conditions and panic button state under appropriate defined conditions.

The badges can be programmed to transmit data from various sensors in batches in response to specific events or at varying time intervals to strike an appropriate balance between speed of response and battery life appropriate to the use case. Data from the various sensors can also be transmitted at varying intervals to reduce the overall amount of data being fed into the system, for example, sending data less frequently if the sensor values do not change rapidly. The badge can also be configured to respond to a 'panic button' press by the wearer or to automatically monitor one or more sensors to detect potential emergency conditions and respond rapidly to send data to the system as quickly as possible, possibly interrupting a regular transmission interval, and/or with a high priority level for faster response.

In a particular architecture, a grid of readers are positioned at fixed locations and linked by a wired or wireless network. The readers feed alerts and data to a local server and/or a remote or cloud-based server via a local signal agglomerating unit(s). The system architecture can include multi-level processing and provides for increased system reliability, a decrease in incidents of false positive and missed alert conditions and provides for a flexible and robust system.

In an embodiment, data streams from the badges and other tags can be received by anchor readers in fixed or ad-hoc positions in addition to mobile, vehicular-mounted or man-portable anchor readers with integrated backhaul such as Wi-Fi, cellular or satellite radios and powered by means such as a vehicles electrical system or rechargeable batteries. The received data can be used to determine the unique identity and location of each tag in x, y, z coordinate planes. That information can be provided to the system along with other information collected from the tag sensors and alerts sent by the tags. Tag location can be determined using conventional techniques, such as geometrically by triangulation or distance measuring using a fixed grid of readers using factors such as time of flight, received signal strength and altimeter data. Multiple data types can be processed, such as other latitude and longitude determination via a GPS and/or onboard IMU data to allow for improved accuracy and cross-checking.

Environmental and asset protection tags with a wide variety of available sensors—such as photosensors (photocells), magnetic switches, gas, chemical, moisture and radiation sensors—can be used to collect data and detect conditions which are sent to the central system and processed to detect particular alert-triggering conditions, incidents of product tampering, and other conditions. The infrastructure components thus receive data from nearby employee tags, asset tags, and other sensors and use that information to detect and alert conditions to send to the server along with the raw sensor and location data In an embodiment, vehicle-mounted and/or man-portable versions of anchor readers are used to extend the system range and allow connectivity to be maintained as a user travels locally or globally. The portable readers preferably are configured to interact with the ID tags/badges in the same way as the fixed reader units so that the tag operation can remain effectively the same despite the change in location and manner of connection to the back-end system. This allows the same data streams to be provided to the central system regardless of whether a user is within a facility or traveling. These reader units with antennae for tag/badge, GPS and cellular and/or satellite signals and/or WiFi can be permanently hard-wired into a vehicle's electrical system and operate to prevent activation of starter solenoid and/or drive motor circuits when no authorized driver is present, as determined, e.g., by regularly downloaded over the air permissions lists. The readers can also be mounted into a hard-wired cradle for quick transition to a man-carried, rechargeable battery mode of deployment, or they can be built as a replaceable battery or rechargeable unit designed to be easily carried by a user.

The reader infrastructure components receive the data streams of tags within range. This data is preferably uplinked at regular intervals, such as every 3 to 5 seconds. Where necessary, data can be spooled for later upload. Urgent alerts can be determined within the tag firmware itself and sent immediately, interrupting the regular interval, with a flag signaling the need for an immediate uplink. The reader can further be configured to detect alert conditions that may be recognized only through examination of information from multiple tags.

Uplink can be accomplished via cellular data link, satellite data link, WiFi, or other data links that may be available. A hybrid unit can be configured to select the least expensive and/or most reliable uplink method available at the time of uplink.

The data streams from the tags include data from the sensors as well as each tag's Unique Identification number (UID). This UID can be used to identify the person or asset assigned to that tag by correlating the UID with the relevant record information in a database used by the software component of the invention and/or in an end-user's Enterprise Resource Planning (ERP) solution. The tag data is collected and processed by one or more back-end systems physically present or in the cloud.

When many tags, such as described herein, are in the field, the system can generate a very large overall volume of information. In an embodiment, multi-level data processing is used to filter, condense, and combine the data so as allow for more manageable processing volumes by upstream components and to detect actual or potential alert conditions at lower levels in the network, and even the lowest level possible for a given alert, to reduce the data burden on the server and provide for faster response times. In addition, various processing techniques can be applied to improve reliability through cross-checking of data streams from complementary sensor sources combined with machine learning techniques to adjust alert-triggering parameter values for each asset, job-title or individual to reduce both false positive and missed positive alerts.

In an embodiment, a versatile rules engine is used to process the data from the ID badges, tags, and other sources. A variety of alerts, triggers, or other actions can be defined based on the received data and other information and can be used to provide indicator signals or alerts or to control system equipment. For example, tag data, temporal aspects (time of day, day of week) and/or location aspects defined by geo-fencing (permitted and/or excluded areas and/or hotspots) can be included in rules which trigger alerts or other reactions.

The system provides a wide range of reaction capabilities. For example, if the data stream values in combination with temporal, presence, location and/or UID group or specific criteria of any given rule are matched, then the reactions defined for the rule are triggered. The reactions triggered by the rules engine activity can range from the transmission of a command to an IP controllable device, to the initiation of an alert, such as notification via text message, computer screen popup, haptic prompt and audible or visual means. In a particular embodiment, the rules engine is integrated within a more comprehensive alert processing system that implements multi-stage notification with branching sets of dialog screens containing live floor plan depictions and virtual joystick controlled CCTV views of the incident site when covered by a camera's field of view. An initial incident commander can be presented with checklists of responsive activities, such as might be taken from the entity's Emergency Action Plan (when available), that need to occur and which are manually checked off to indicate completion. A list of automatic reactions being triggered can also be shown. Contingency actions can be automatically implemented if appropriate responses from an incident commander are not received.

In an embodiment, the flexibility and functionality of the system can be further enhanced by a back-end database that links ID tags to various attributes, such as the authority granted to the person to which the tag is defined, areas where they are permitted or not permitted, and their qualifications and training. This can be used to automatically ensure that safety, security, and other requirements are met. For example, if an individual is permitted access to a restricted area, but only when accompanied by a supervisor, the system can automatically determine if this is true. If the conditions are not met, a suitable alert can be triggered which activates a physical barrier or other mechanism to prevent access. For example, a remotely controlled lock can be activated, the user's access privileges to unlock the door by swiping their ID card can be temporarily disabled, a turnstile can be frozen to prevent pass through, or in other similar manners.

In another application, a specific piece of machinery may be configured with a remote cut-off mechanism. The machinery can be remotely disabled or initial activation prevented if the system determines that the detected operator is not qualified or is qualified only if supervised and an appropriate supervisor is not present. Conventional remote-disable technology can be integrated into the system for this purpose.

In an inspection situation or other location subject to personnel training and number requirements, such as an OSHA-regulated environment, the system can detect if employees with the correct qualifications and/or minimum numbers are present. Asset tag usage on personal protective equipment can be further used to ensure that appropriate personal safety or other equipment, such as that required for confined space entry, are present before work is allowed to proceed. If work proceeds without meeting the required criteria, an alert can be automatically triggered.

In an embodiment, the system combines sensor data with other security monitoring data, such as from video, audio, and other surveillance systems, and provides further flexibility and security. The video data and detected badge data can be cross referenced to detect anomalous situations. For example if two people are detected in a video feed's arc of view of a restricted area but only one authorized badge is detected, entry to other areas can be denied and other user-specified actions taken.

In an embodiment, the system also includes an intelligent alert distribution and notification functionality. If a rule triggers a notice that should be sent to a group of people, the system can define the group dynamically to select targeted recipients of the notice who are qualified to respond to the particular event and who are currently present either at the facility and/or in on-duty status and within a definable radius of the event site. The group definition can be further dynamically adjusted and/or expanded to include additional members if a suitable response is not received by a member of an initial group within a defined period of time.

In some emergency situations, multiple tags can detect an alert situation or be triggered by a wearer pressing a panic button. In an embodiment, the system is configured to detect when multiple triggers, including panic button triggers, are received and related to one another. The multiple events can be intelligently de-duped to minimize sending duplicate alerts for the same event. At the same-time, the system can provide an escalation process of the alert transmission to higher levels of management and/or directly to first responders, based upon the number of persons activating their panic button or having a badge trigger within a predetermined time frame. The escalation is thus, in a sense, crowed-sourced.

In an embodiment, the disclosed systems and methods also provide valuable support in emergency conditions that require mustering and evacuation of staff. The system is configured to track badge locations relevant to information about employees and others known to be on-site and generate a real-time list of individuals remaining within the site to be evacuated as well as those already evacuated and present at rally points. This information is combined to produce a missing persons list, consisting of as well as those people who were recorded by the system as having been at the site when the emergency began and are unaccounted for. Their last known location is retained by the system and can be used as a starting point for a search. Because the system can register and track guests, individuals who are not known to general employees and who might otherwise be overlooked can also be addressed. Real time data about on-site geography, local conditions, and information about individuals who have not been evacuated can further be provided to first responders to aid in rescue safety and other response efficiency.

BRIEF DESCRIPTION OF THE DRAWINGS

Various features and advantages of the invention, as well as structure and operation of various implementations of the invention, are disclosed in detail below with references to the accompanying drawings, in which:

FIGS. 5D-G are detailed views of the display screens shown in FIGS. 5A-5C;

DETAILED DESCRIPTION

Figure 1A:
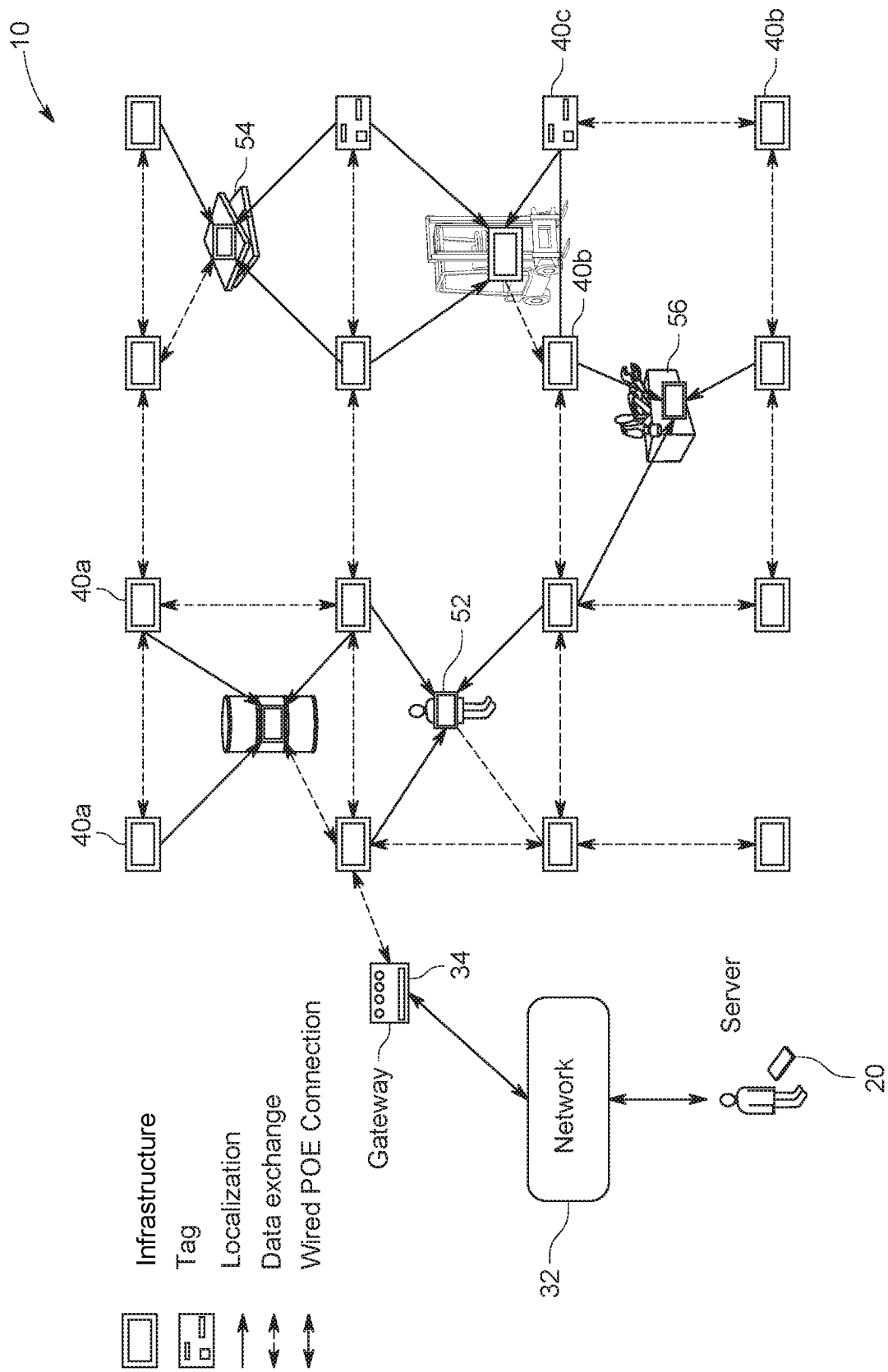
FIG. 1A shows a high level drawing illustrating location and architectural topology of various system components in an embodiment.

FIG. 1A is a high level drawing illustrating the location and architectural topology of various components in a system 10 according to an embodiment of the invention. The system includes a server 20 (which may be a single computer system or a distributed computing system with local and remote components depending on the implementation). The server 20 is connected through a network 32 and/or at least one gateway 34 to one or more infrastructure components 40, such as infrastructure components 40a, 40b, and 40c.

Infrastructure components 40 are system components used to determine the location of a tag, such as tag 52 on a person, tag 54 on an inventory item, or tag 56 on a mobile asset, such as tools or equipment. Preferably, active RFID tags are used in connection with personnel and high-value assets. However, other tag technology that allows a tagged item to be located can also be used in an alternative.

In a particular configuration, primary hardware infrastructures to determine location can be based on Received Signal Strength Indication (RSSI) triangulation wherein ID badges/tags can be located to within in as little as 4 meters indoors and 5 meters outdoors. In addition, or alternatively, ultra wide band (UWB) based time of flight triangulation process can be used. UWB can provide location accuracy within 1 meter, making possible more accurate implementation of rules involving proximity of persons and assets. Other technologies can be used as well. As discussed further herein, in addition to an RFID component, the tags can include various sensors that can be used to detect emergency conditions, such as a man-down or a severe fall. The specific hardware used for the infrastructure component 40 depends on the physical location and environment the component 40 will be in, the technology used for the tags, and the degree of autonomous processing that the components will perform.

The components 40 preferably comprise an active RFID reader to read tags within range and a separate RF transceiver to receive data transmitted from nearby tags and a small form-factor computer, such as a NUC from Intel™, which can drive hardware used to communicate with nearby tags, receive tag locations (if tag triangulation is performed using separate devices) or determine tag locations, receive limited rule sets from the server, and execute those rules using data received from the tags within range as discussed more fully below. Where a tag is within range of one or two infrastructure components, its location can be estimated based on the known location of the component(s) and their read radius, or read radii overlap area when read by two devices. If the tag is within range of three or more infrastructure components, its position can be determined more precisely using a triangulation method as well as the tags integral altimeter when installed. Various methods of determining the position of an active in an environment are known to those of skill in the art.

The infrastructure components 40 also include a transceiver which is used to connect that given component directly, or indirectly, to the sever 20. Each component 40 can have a direct wired or wireless connection to a gateway 34 connected to the server 20 (directly or through the network 32). Multiple gateways 34 can be provided. Alternately certain infrastructure component types can connect directly to a server 20 without requiring a gateway. Components 40 can also exchange information with other nearby components 40 to define a mesh communication network to link to components 40 that are out of range of a gateway 34.

Different versions of components can be provided for indoor and outdoor uses. Infrastructure components 40 can be fixed elements within a facility and can communicate using a local network or short to medium range RF communication, such as Bluetooth or WiFi. Infrastructure components intended to be used remote from a facility can be configured to communicate using long range RF, such as cellular data systems, licensed band RF or satellite communications.

As noted, one function of the infrastructure components 40 is to detect or participate in the detection of nearby tags to determine their location. Another function of the infrastructure components 40 is to receive data and alerts transmitted by nearby tags and forward such alerts and information to the server as appropriate. Preferably, the infrastructure components 40 each include a local processor that is configured to filter out alerts deemed to be false positives and to trigger alerts and/or pass-along alerts deemed valid based on the information received from one or multiple tags within range and possibly additional information as well. It should be noted that the infrastructure components with RFID (or other) readers and which are used to determine the location of a tag may be separate devices from the components that receive sensor data, alerts, and other communications from tags within range and forwards that data to the server 20.

In an embodiment, the system 10 is configured to combine and merge indoor and outdoor/mobile geo-location and other functionality seamlessly. Infrastructure components that operate outdoors can be connected to the server 20 using long-range RF, such as a cellular or satellite modem. The outdoor units preferably function similarly to the indoor ones in terms of locating nearby tags and communicating data between the tag and the server 20. As a tag leaves an indoor facility, it comes into range of the outdoor infrastructure components. GPS units in the infrastructure components can be used to determine their location, particularly for infrastructure components that are mobile or installed temporarily.

The infrastructure components may also be portable components that can be moved to remote facilities or locations and, in an embodiment, are small enough to be carried by an individual or fixed to a vehicle or other mobile asset. Battery or solar/rechargeable battery powered devices can be provided for use in the field. For tag location applications, the specific location of each infrastructure component can be determined during installation and this information stored in a database available to the server 20. For infrastructure components that can be moved, location information can be provided by a local GPS receiver or other known techniques.

Mobile components allow for the security and safety measures implemented by an embodiment of the invention and provided by the fixed systems to be extended into the field and, in fact, to any place with access to a wireless data service, such as cellular, WiFi hot spots, or a sky view for satellite data transmissions. Remote safety measures can be implemented to prevent use of equipment if the necessary operating conditions are not met. In one configuration, on-site construction equipment startup can be blocked or certain features locked out if the system determines that required operating conditions are not met. Example operating conditions include the system detecting via tags that a sufficient number of authorized individuals are in the area, that the individual in the driver seat is authorized and has necessary training, and that a required supervisor is present. Of course, other required operating conditions can also be implemented as addressed in more detail below.

Figure 1B:
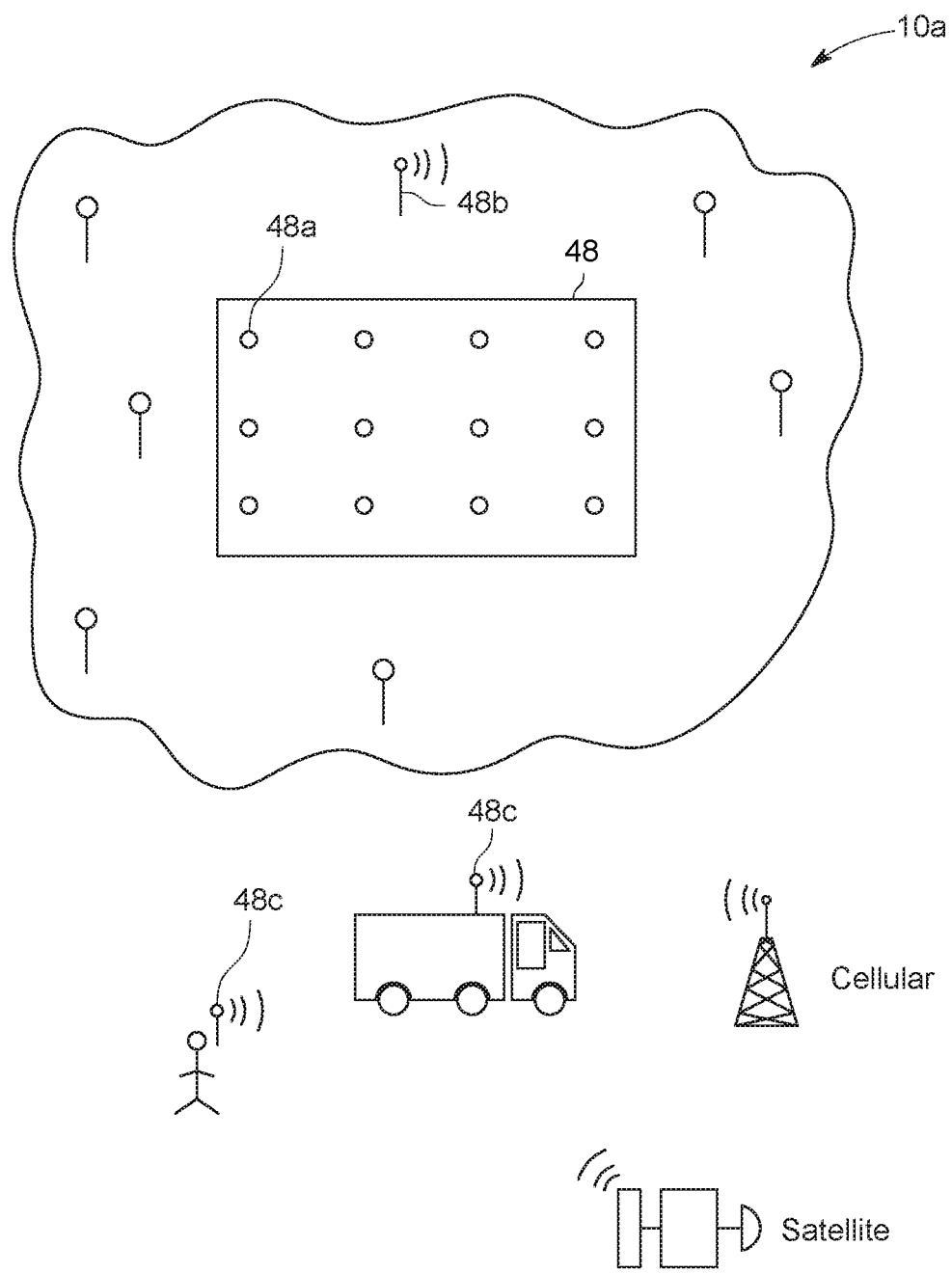
FIG. 1B is a diagram showing a typical configuration of the elements in an embodiment.

FIG. 1B is a diagram showing a typical configuration of the elements in an embodiment of a system 10a as disclosed herein. A facility 48 has an infrastructure grid arranged inside the facility that comprises fixed location infrastructure components 48 configured to detect badges and other tags throughout the facility and to receive sensor data. Outside infrastructure components 48b can be provided in a geographic area surrounding the facility. Typically these units will be spaced further apart and will be in fixed or semi-fixed positions. Mobile infrastructure components 48c, such as mentioned above, can be carried by individuals or be vehicle mounted and are configured to connect to the main system using cellular or satellite communication and operate to operate interact with nearby tags and sensors.

Figure 1C:
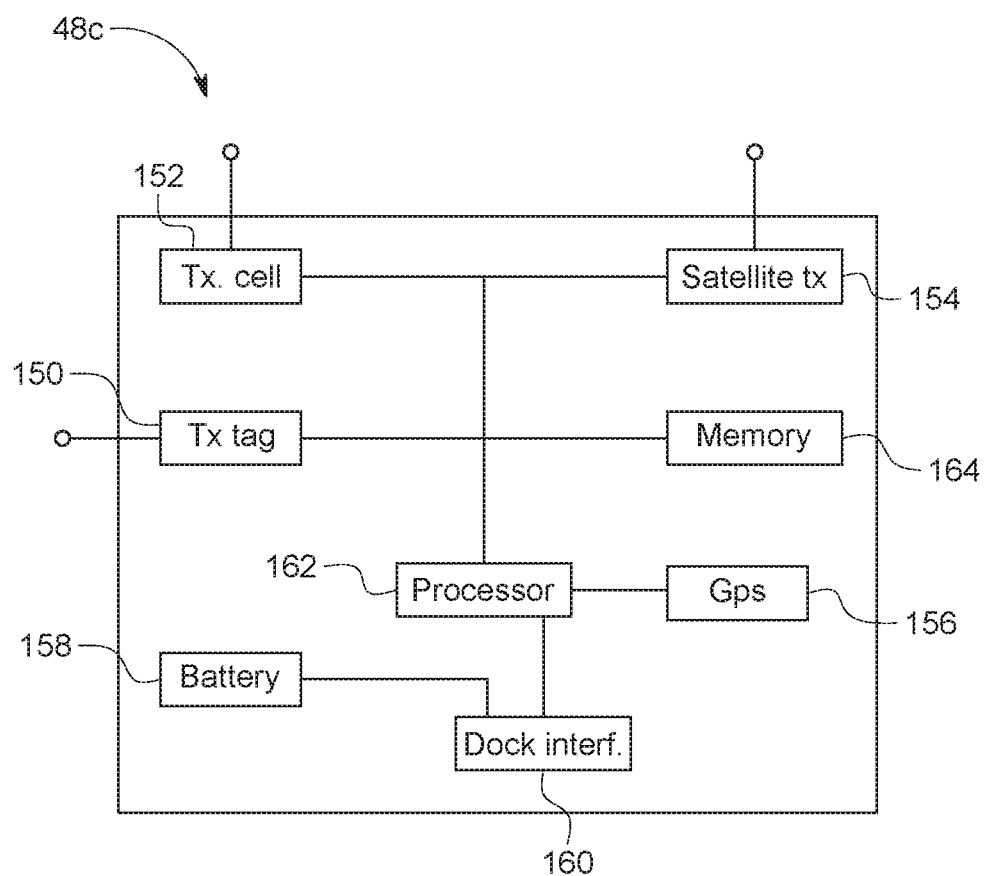
FIG. 1C is a block diagram of a vehicle-mounted and/or man-portable device.

FIG. 1C is a high-level block diagram of a vehicle-mounted and/or man-portable device 48c that can be used to extend the system range and allow connectivity to be maintained as a user travels. The device 48c includes a tag reader 150 for reading nearby user badges or other tags, cellular and satellite transceivers 152, 154 for communicating with the remote system, a GPS 156 unit for determining location, a battery 158 to allow for remote usage and a docking interface 160 to allow the unit to mount in a vehicle, access power, recharge batteries, and other functions. The device 48c is controlled by a processor 162 with memory 164 to store local programs, rules, and other data in order to provide the functionality discussed herein.

Figure 2:
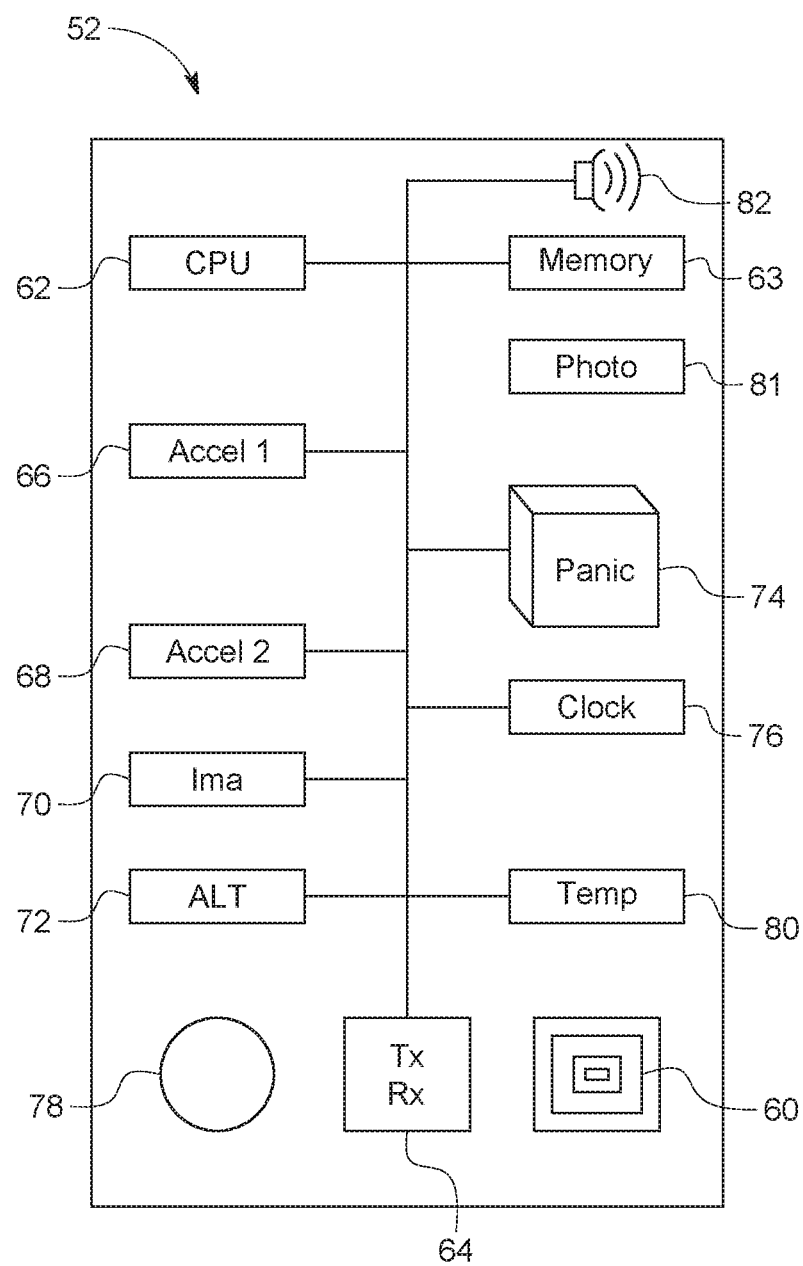
FIG. 2 is a block diagram of an active ID tag for use in various embodiments.

FIG. 2 is a simplified block diagram of a tag 52 for use in connection with the disclosed system and, particularly, an active ID tag that can be worn by personnel. The tag 52 includes an ID repository, such as an RFID element 60, which can be a passive RFID inlay tag, which can be used to store the unique passive ID and send it to a nearby reader in an infrastructure component 40. The tag also includes a processor 62, program and data memory 63 storing various information which can include rules, parameters, a unique active ID for the tag, etc., and a transceiver 64 for sending data collected from a plurality of sensors, such as sensors 66-72 and 80, 81. A panic button can be provided 74 and which can be pressed by the user in the event of an emergency. An internal clock or timer 76 may also be included. The tag is powered by a battery 78 which may be rechargeable via a connector. Alternately, the battery can be user replaceable via a compartment door. The battery case may also be charged by induction and the exterior case may be totally sealed for water and dust protection. A speaker 82 may also be provided to allow output of pre-recorded audio alerts or instructions, or output of audio data transmitted to the tag. A microphone (not shown) can also be provided to allow for some two-way communication or local audio sensing although the tag is not intended to replace more conventional, high-bandwidth communication systems, such as radios and cell phones.

Preferably, the tag incorporates two accelerometers: an electronic 3-axis accelerometer 66 and a mechanical accelerometer 68. The electronic one allows for highly accurate detection of acceleration events, such as those involved with accidental falls as well as the initiation of movement or the absence of movement. The mechanical accelerometer permits substantially longer battery life in asset tags, as it permits a sleep mode with very little or no battery drain to initiate, then allows for immediate wake-up with full functionality when it is moved. An inertial measurement unit (IMU) 70 can be provided in addition to, or in place of, the electronic accelerometer 66. The tag can also include an altimeter 72, such as a barometric altimeter. A thermocouple or other temperature sensor 80 can also be provided. Other environmental sensors, such as a photocell 81 can be provided as well. The altimeter 72 can be used by itself or in conjunction with triangulated and/or IMU detection of altitude changes that may occur during a user's fall. The photocell 81 and thermocouple 80 can be used to provide information useful in assessing conditions such as ambient smoke or fire.

In an embodiment, tag 52 can be used for multiple purposes. First, it can be assigned to a specific person and detected by infrastructure units 40 to determine the location of the individual wearing it. Second, the tag 52 can be programmed to signal an emergency alert when the wearer presses the panic button 74. This alert can be detected by nearby infrastructure units 40 and conveyed to the server 20. Third, the tag 52 can read, store, and transmit data from the various sensors, which transmissions can be received by nearby infrastructure units 40 and conveyed to the server 20 for analysis to, e.g., detect emergency conditions. The collected sensor data can be transmitted by the tag 52 in real or near real-time or periodically in batches. The rate at which sensor data is collected and transmitted can vary depending on the sensor at issue and how rapidly its reading typically changes as well as the communications protocol employed to transmit the data and the overall use case. Data can be sent on an on-going streaming basis, at regular intervals ranging from a few microseconds to seconds to minutes, in response to queries sent by the server 20 via the local infrastructure 40, or in response to a designated event, such as when a panic button 74 is pressed or an actual or potential emergency condition is detected by the processor in the tag 52 based on data from other sensors.

The amount of data sent by the tag 52 during normal operation can be limited to reduce the overall system load. In an embodiment, firmware in the tag 52 can be programmed to perform at least initial data processing on the sensor data to detect when a potential emergency condition or other defined event condition may exist. For example, the tag 52 can be configured to detect when it has been motionless for more than a specified period of time or if there is a strong shock or sequence of shocks, typical of an event such as a hazardous fall registered by the sensors. In response to identifying this condition, the tag 52 can issue an alert signal that would be passed through the network to the server 20. Relevant sensor data can also be sent at that time. The alert and data can be sent at a high priority so that they arrive at the server 20 as quickly as possible. The tags 52 are preferably easy to reprogram, such as remotely through a docking cradle or cable connection or other mechanism, to allow the detection threshold parameters and other internal functionality to be changed. Machine learning algorithms implemented at the server 20 or other device analyzing system data and operation can be utilized to adjust these parameters incrementally in order to improve accuracy by minimizing false positive alerts while limiting the number of missed positive events and, in a best case providing or maintaining the ability to detect all true positive events. Advantageously, by offloading some data processing to the tag, the total amount of data that the server needs to process can be significantly reduced.

The server 20 may perform a second level of analysis on the received sensor data from the tag 52, and on possibly additional data to determine whether the alert should be triggered. Such additional data can include the location of the tag 52, the individual assigned to the tag 52, and data related to that person such as the task the individual is expected to be performing at the time, time of day or week, and the ambient environment. The ambient environment can comprise basic information derived from the tags location, such as inside or outside or in a zone tagged as restricted or hazardous. Other environmental conditions can comprise information about others individuals (as indicated, e.g., by other tags) at that location, sensor information provided by the tag 52 or other tags 52 in the area, and other types of data. Different conditions may warrant different thresholds for accepting an alert. For example, the threshold for accepting a fall alert may be lower for an individual by themselves in the field than for an individual on-site and at a location with several other people. Similarly, the actions triggered by an alert may vary based on the conditions. This is discussed in more detail below.

Figure 3:
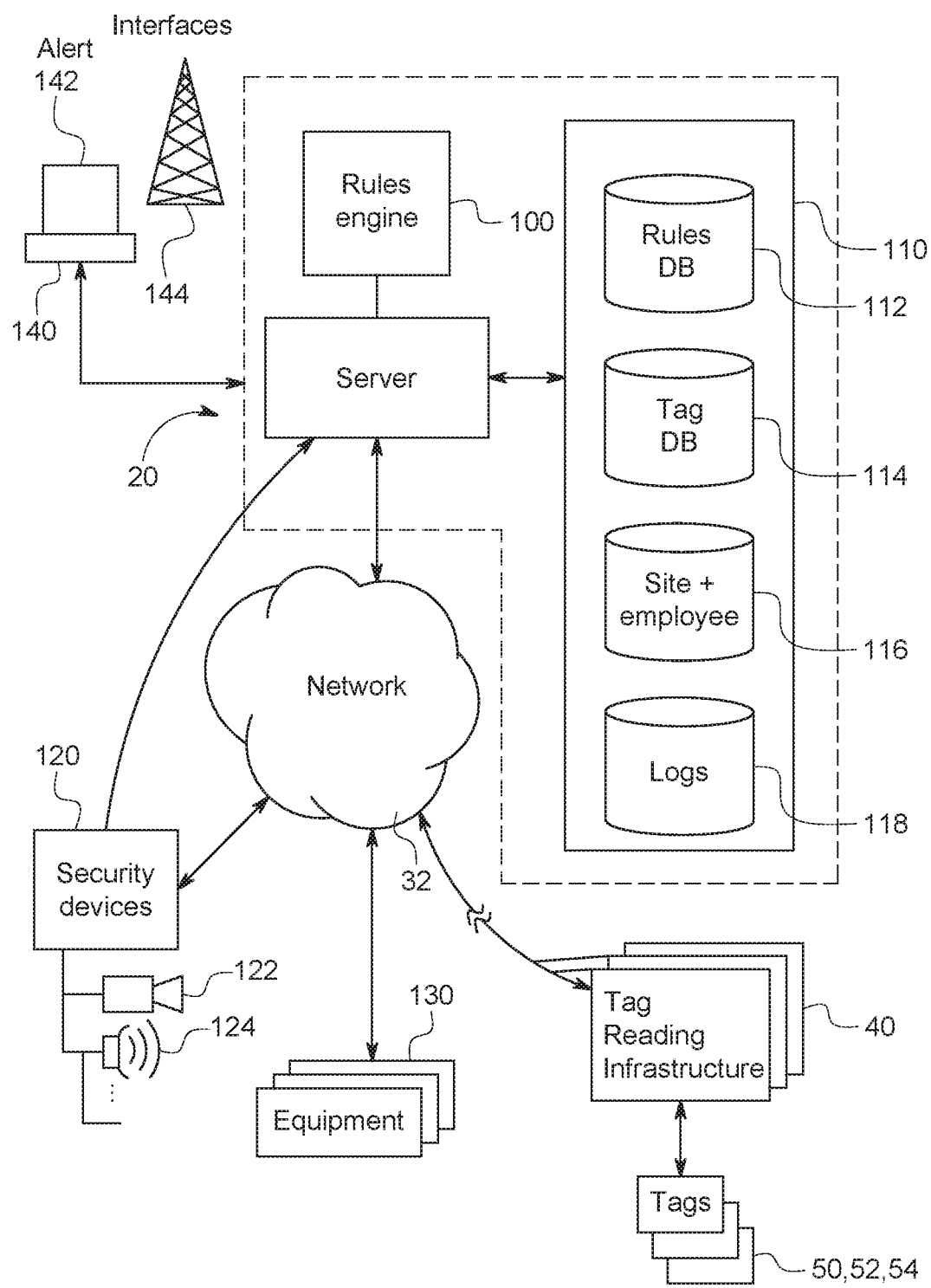
FIG. 3 is a high level block diagram of a server system and related components in an embodiment.

FIG. 3 is a high level block diagram of an embodiment of the server system 20 and related components. As generally depicted, the server 20, which can be a conventional stand-alone or distributed computer system, is connected to a rules engine 100 which manages various alert and other scenarios as discussed further herein. A data storage 110 contains information, including information about the defined tags (50, 52, 54), rules for processing alerts and other conditions, information about the environment (such as the layout and location of various assets), data about individuals assets and locations associated with the various tags, and system logs. Storage 110 can be structured in various manners, such as described herein. In FIG. 3, the storage 110 has separate tables in a relational database: 110, 112, 114, 116, and 118 for storing the differing types of information. Storage 110 can be local to the server 20 or connected to it externally through a local connection, such as a LAN, or through other networks including cloud storage. The server 20 receives information from the tag reading infrastructure 40 including information collected from the various types of tags, 50, 52, 54, and processes the received data and alerts using the rules engine 100 in accordance with rules and procedures defined in a rules database 110.

Sever 20 can also be connected to various security and monitoring devices 120 in the facility, directly or through a network or other intermediate system. Security devices can include cameras 122, motion detectors 124, and other devices. Information from the security devices 120 can be used in conjunction with alert processing as described herein.

Server 20 can also be connected to various equipment 130 that may be controlled in response to an alert. Equipment 130 can include, for example, access control devices such as door and turnstile locks or other movable barriers to entry, elevators, vehicles or machinery, cameras or other monitoring equipment (which may also be security devices), and other equipment such as audible or inaudible alarms, security startle and standard lights, strobes, and other equipment that has one or more features or functions that can be remotely controlled.

The server 20 can also be connected to one or more alert interfaces 140 which are configured to allow individuals to interact with the server 20 in response to an alert. Alert interfaces 140 can comprise a computer terminal 142 or other web-enabled device such as a smartphone or tablet computer. The alert interfaces 140 also can provide a channel through which the server 20 can communicate with individuals and devices not otherwise on the network 32, such as via a cellular or other RF communications, wired telephone, etc.

In an embodiment, various features and functions of the system are enhanced and supported by a robust dialog and rules based interface and management system. The configuration and system architecture provides improved accuracy in detecting potential or actual alert situations. It further provides a dynamically controlled system for reporting and escalating reporting of alert conditions and for ensuring proper actions are taken in response and initiating such actions as appropriate.

A wide variety of scenarios and alerts can be addressed by various embodiments and configurations of the present system and methods, including detecting, monitoring, and/or responding to multiple types of situations and conditions such as one or more of the following:

Detecting when restricted areas are entered by unauthorized staff, visitors or contractors and taking responsive actions. Actions can include signaling an alert to security personnel, denying access to equipment or areas, and disabling equipment.

Detecting when an individual attempts to enter a specific area without the proper accompaniment. Responsive actions include signaling an alert to security or other personnel indicating the rule violation type, locking or disabling equipment, denying access to further areas. The security measures can be discontinued when the system detects proper accompaniment has arrived.

Detecting a person attempting to operate machinery without having the appropriate training/certification or required supervisor or assistants. Responsive actions include signaling a cutoff mechanism to prevent operation of the equipment. For example, an Internet Protocol (IP) command can be sent to a networked relay which locks or disables equipment. An alert signal can also be sent to security or other personnel indicating the deficiency.

Detecting when equipment (that can have its own tags detectable by the system) is moved without someone with authority to do so being present in the near vicinity. An alert notice can be sent to designated recipients.

Detecting when staff leave authorized areas or, and conversely, when staff enter prohibited areas and taking responsive action(s), such as sending alert notice to designated recipients.

Detecting when the panic button alert is triggered on the ID badge and taking responsive actions, such as notifying security, emergency, or other designated personnel. Designated personnel can be selected based on system knowledge of individuals in the vicinity of where the panic button was pressed.

Detecting when a person is incapacitated and taking responsive actions, such as notifying security, emergency, or other designated personnel. Designated personnel can be selected based on system knowledge of individuals in the vicinity of where the panic button was pressed.

In a particular configuration on-site contractor employees can be issued badges that are tracked to enforce restrictions on access to areas other than geo-fenced permitted: 1) work areas, 2) corridors to entry/exit, corridor to rest rooms and any break areas. The system can provide effective, automated confinement to permitted areas at sensitive sites and detect when the individual enters an area in which they are not permitted to be. Equipment can be fitted with tags and movement by non-authorized persons detected and automated alerts and reactions triggered, such as locking doors, restricting elevator access, displaying a video feed of the area to security personnel, sounding an alarm, etc.

Other equipment can also be activated in response to an alert. For example, the system can be configured to check the time to see if the alert is received after dark, or to detect whether sensor data from the photo-detector in the badge indicates that it is dark in the area where the alert has been triggered. In response, the system can activate emergency and/or startle lights in that area. If the system detects that a person is detected in an area where they are not supposed to be, including outside areas, startle lights, spotlights, and other equipment can be activated in response. The system can also initiate audio warnings that are played in the area.

When an alert is detected, the system can alert relevant security personnel by sending a message to one or more designated security staff. Messages can be sent by SMS text, voice, or other mechanism. The personnel to whom the alerts are sent can be determined by the type of alert, the individual(s) assigned to the badge(s) from which the alert was triggered, the location of the badge, static and dynamic conditions at that location including information about other individuals detected in or assigned to the region of the alert, and the actual or expected location and availability of the individuals to receive the alerts. In this manner, the system more efficiently ensures that the alert notification is sent to the most appropriate individual(s). This reduces the likelihood of alert notices not being received or being received by someone inappropriate or unable to respond.

An individual receiving an alert may be required to respond in a manner indicating that the alert was received. In an embodiment, the system is configured to detect when an alert was not received or a receipt acknowledgement not returned to the system, or detect that the alert was received but the recipient has not responded to it. The system can escalate the alert or reroute it to an alternative or backup person(s) using a combination of static and dynamic considerations. An alert notification can include an alert response action list that is presented to an alert recipient at the receiving device. The action lists indicates reactions that are required to be taken in response to the particular alert and can also indicate actions that the system will automatically take or that others have already taken to avoid duplication of efforts. Thus an alert notification list can include one or more of actions designated as ones any recipient can take, designated as actions that only specific individuals (such as those with particular responsibilities, authorization, employment status, or other) can take, and actions that the system will automatically take possibly as a contingency only if other steps are not taken. Different alert recipients may receive different action lists according to their responsibilities. This provides for an increased response efficiency by ensuring that the alerts reach those individuals most necessary or other preferred responders, and that those who receive alerts receive information indicating what actions they should take and what actions have already been taken (by them or others) so as to avoid duplication of efforts where a given action may be tasked to more than one person.

Thus, according to an aspect of an embodiment, the system can be configured to receive a message indicating that an alert has been received by a specified individual, such as a read receipt generated by recipient device when the alert message is opened or by a manual alert acknowledgement sent from the individual's device, such as by pressing a receipt-acknowledge button in a device APP. The system can be further configured to detect when it has not received within a specified period of time an indication that an alert has been received. Upon such detection, remedial actions can be taken such as by rerouting the alert to a backup recipient or by triggering a secondary alert.

In a configuration, the system can receive indications that various required actions to an alert have been taken. In response, the system updates the relevant action-item list for other alert responders who may also have had responsibility for that action. If the system detects that a required action has not been taken within a specified period of time, the system accesses a list of backup personnel or implements one or more rules identifying one or more backup persons for that action based on static and/or dynamic considerations and then shifts responsibility for the action to the backup(s). Updated alert action lists can be distributed to various recipients.

Advantageously, and according to aspects of the present invention, the automated targeted distribution, tracking, and updating of custom and person/function-specific action lists reduces informational noise and improves efficiency by not presenting a given individual an action item that is irrelevant to or outside of their responsibilities or capabilities. For example, a floor fire marshal may be tasked with checking all of the offices on their floor but not in triggering a shutdown of equipment. The action item checklist sent to the fire marshal's phone or other communication device could require actions including verifying that individual office checks of a given floor or area have been done. However, actions to implement an equipment shutdown task may be outside the purview of the fire marshal and so not even sent to and/or shown on the fire marshal's device.

The system can be further configured to cross-reference the determined location of individuals designated to receive specific alerts and adjust notification accordingly. As an example, in a fire alert the system can retrieve information indicating the fire marshals assigned to each building area and then cross-reference this to the detected location of those individuals. If the system determines that a designated floor fire marshal is not near the floor they are responsible for, the system dynamically send the specified alert and checklist to a backup that it determines to be present in the local area. If no backups are determined to be in that area and/or the system detects that the action-item has not been marked as complete within the specified time, it can provide this and/or supplemental alert information directly to first responders or assign the task to someone near the area who is capable of performing or delegating the task even if it is not a primary responsibility.

Alternatively, or in addition, alerts can be signaled on or to a Central Security Console or control room. Designated security or other monitoring equipment can be activated or selected to provide console operators with the information needed to respond.

According to further embodiments, the system is configured to implement other features and functions that include automated alert responsive actions and notifications, such as one or more of the following:

In an evacuation scenario, the system detects individuals present at rally points and/or who have been marked as having evacuated and provides this information, such as in list form, and further generates a real-time missing staff list a list of those evacuated and present at rally points. Staff or others remaining on site can be detected. Floor plans, such as for the areas of a facility where remaining individuals are detected or expected to have been, can be retrieved and presented to appropriate personnel.

Detecting "man down" situations and generating alerts accordingly.

For first responders: wireless tablets or other computers can be configured to have remote access to the system over the internet or an intranet and can be given to the Incident Commander. ID badges assigned to response team members are tracked by the system. Directions can be generated based on floor plans and other maps and target locations to guide responders to designated points. Local badges and other fixed sensor suite tags can be read and sensor data analyzed to detect smoke (via photocell detected dimming for example) and heat conditions in each corridor, helping determine a safe possible rescue route.

ICs and First Responders can also be provided with information to aid in the response efficiency. For example, to aid in triage, the location of all persons in building to be rescued can be displayed along with triage-assisting information such as time since last movement, ambient temperature, proximity to a responder, existence of safe route to victim and to escape. The location of potential victims can be determined with high accuracy and the system configured to provide a real-time view of responder locations generated based on location of responder ID badges. The system can be further configured to access floor plan and site condition information and then display, e.g., on an APP running on a tablet device, present floor plans with corridors and/or rooms color-coded by smoke/heat intensities along potential escape routes. Data blocks can be displayed alongside victim location dots in a site map depicting ambient temperature, prone or standing orientation, time of last movement, an image e.g., of the victim, mobile telephone number, chronic medical condition, etc.

Features and functionality of embodiments of the invention can be of particular benefit to a manufacturing plant. In various embodiments, the system is configured to:

Track routine inspections, calibration and preventative maintenance and generate alerts when required stops of the appropriate duration for vehicles or other equipment are not made within the proper time frame.

Provide automated verification of sampling site, time, temperature log, and chain of custody records for quality control, e.g., of grab samples.

Monitor required staffing levels in a control room and other areas within a facility, including the facility as a whole.

Enforce confined spaces regulatory and other safety standards requirements for training levels, number of people & proper Personal Protective Equipment (PPE).

Provide time clock functionality by detecting and logging arrival, location, and departure times of badged employees.

Features and functionality of embodiments of the invention can be of particular benefit to management of personnel, equipment and vehicles on the road and at local and remote job sites. In various embodiments, the system is configured to:

Actively locate and monitor for safety personnel, equipment and vehicles on the road and at job sites by enforcing safety requirements, preventing use of equipment and/or vehicles if requirements are not met, and/or signaling alerts when violations are detected.

A mobile infrastructure device installed in a vehicle provides a protective "bubble" that can extend to a radius of 150 feet or more from such vehicles.

Transmit panic/duress button alerts along with the GPS position of the vehicle and distance to victim who pressed the button.

Generate alerts when vehicle or other equipment is moved by other than authorized personnel.

Prevent a vehicle or other equipment from being operated without authorized person(s) present.

Track vehicle locations and routes taken as well as providing access to route history.

The combination of badges/tags for individuals and for assets can be used to increase asset security. Functionality includes real time location and protection of fixed and portable equipment including, e.g., laptop computers, test equipment, tools at the job site, biohazards, and radiation hazards. The system can detect conditions such as an asset leaving permitted geo-fenced areas indoors or out, movement of an asset without an authorized person(s) present, movement of assets outside of permitted days and hours, detection of a tagged asset either inadvertently left behind, or intentionally taken from personnel and trigger alerts or other responsive actions.

The various features and functionality of the disclosed systems and methods can be used in the context of a variety of other different business environments as well, including corporate environments and commercial airlines, to provide safety and risk management support.

Various specific features and functions of the system are addressed in more detail below.

Lone worker safety is a clear and growing concern. According to an embodiment, personnel can be issued an active ID badge, such as badge 52, having an integrated panic button 74. The software in the badge is configured to monitor the state of the button 74 and detect when the button 74 has been pressed in a particular sequence. For example, the sequency can comprise a button press 3 or more times within 5 seconds of the first press. In response to detecting this sequence, the badge software it triggers an alert that is transmitted by the badge 52. The alert is received by one or more nearby infrastructure components 40 that can then be distributed further by the system. The alert can be tagged as "instant" which indicates that it should be processed at that time and not queued for later processing.

When a panic button press is detected and reported, a responder will typically want to go to the location of the potential victim to determine the nature of the event. The system can be further configured to detect when more than one person activates an alert within a given time span. If alerts are received, e.g., at the server 20 from more than a predefined number of people activating the panic buttons 74 on their badges 54 within a predefined period of time, the, the system can in response treat it as a major incident and automatically initiate a call to designated local emergency services using a phone number stored in the system. Designated responders can be provided with additional information, such as the number of people signaling distress and their positions. In this way, emergency personnel are sent to the victim's location without delay.

Figure 6A:
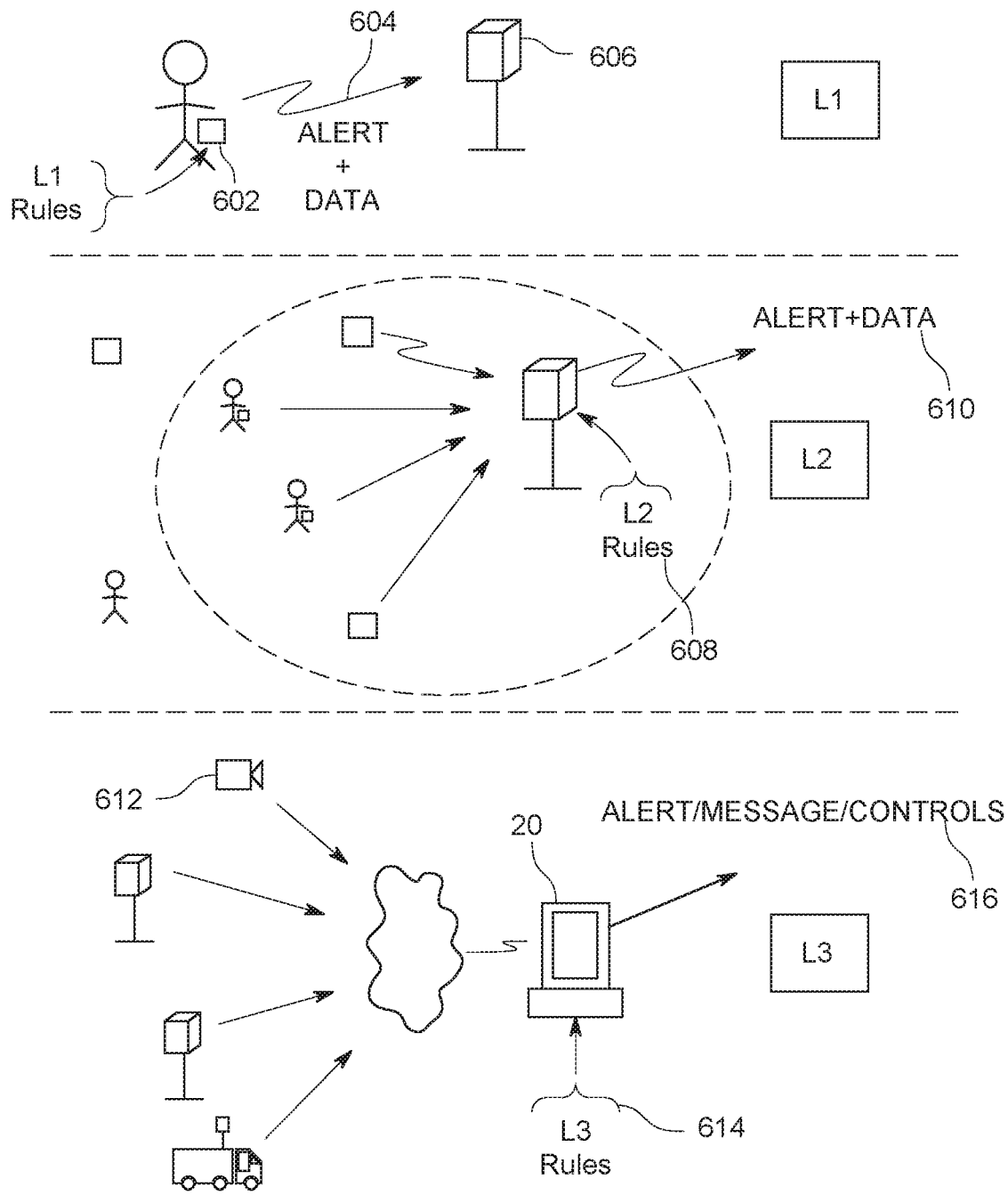
FIG. 6A is a high level architecture diagram of a multi-level alert processing and notification system according to an embodiment.
Figure 6B:
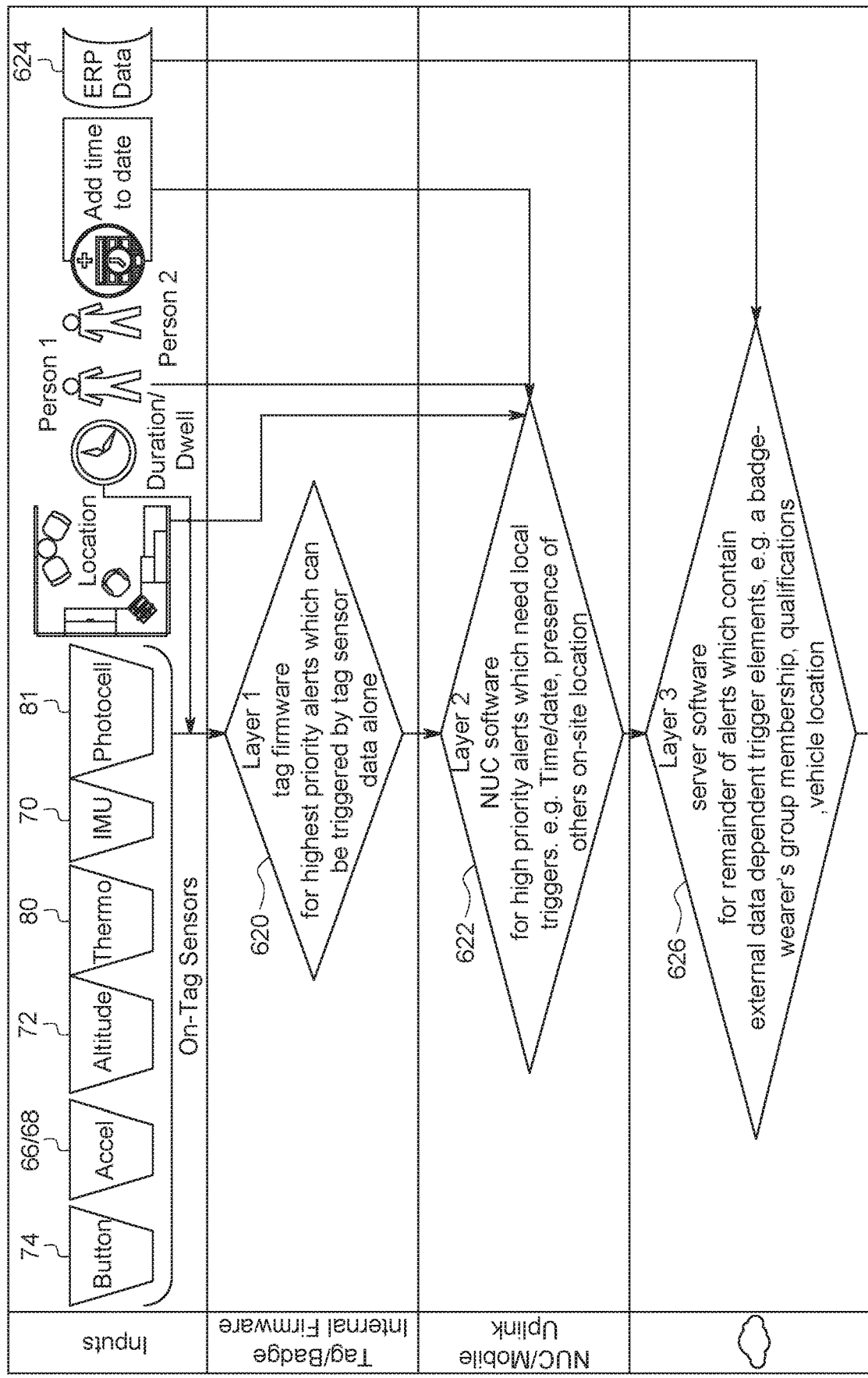
FIGS. 6B and 6C show a flow diagram detailing a particular method for using multitrack data evaluation according to an embodiment.
Figure 6C:
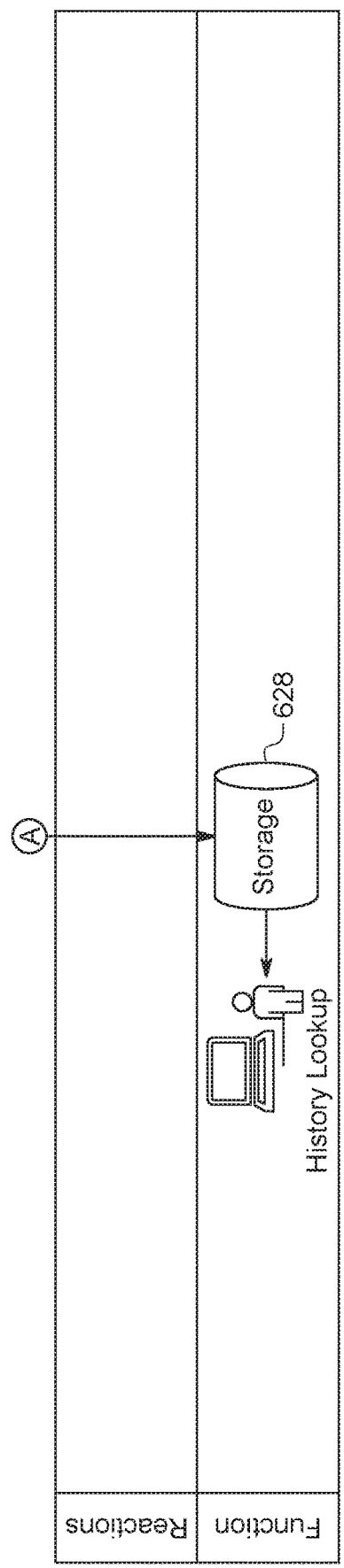

To provide further granularity, and as discussed in more detail with respect to FIGS. 6A-6C and other figures herein, a multi-level alert processing system is implemented. In this configuration, some alert processing is offloaded from the server to intermediate infrastructure components or other notes in the network paths between the end badges 52 and the central server 20. In an implementation, when an infrastructure component 40 or upstream node connected to a set of infrastructure components detects that multiple panic button alerts have been received from nearby tags within a given time span, a higher severity alert can be generated in that device indicating that a multi-panic button event condition exists and this alert sent to the server 20.

In a further embodiment, badges 52 can be configured to process data from embedded badge sensors in order to detect when a person wearing the badge may have fallen and is unable to press the panic button. Preferably software within the badge signals a fall condition when two or more specific fall indications are detected. Preferably the individual indicators comprise (1) one or more of the accelerometers in the tag detect a zero (or near zero) g value for at least a first period of time (including free fall) followed by an impact that exceeds a specified threshold, such as greater than 1.2 g; (2) an altimeter reading that detects a drop of greater than a set threshold in a given period of time, such as a drop of greater than 1 m in less than 1 second or 1 m in less than 2 seconds, and (3) an IMU sensor reading that specifies a drop of greater than a predefined value, such as 2 m. A further indicator that can also be considered is a combination of a rapid rotational or attitudinal sensor change optionally with or without, perhaps without an accompanying translational motion above a minimum threshold. By using multi-parameter analysis, the badge firmware can more accurately differentiate between an actual fall and sensor readings that may be generated from non-fall type conditions, such as a user tapping their badge on a table.

The sensor data provided by the badge to the system over time can be used to refine the fall detection process. Machine learning algorithms can be used to process the sensor data that triggered the fall alert along with information indicating whether or not the fall detection was a false alarm to refine the threshold parameters in the firmware rules. Additional processing can also be done by the server 20 to filter out false alarms. In this way, the badges 52 can be programmed to detect falls with a potentially large margin of error (in favor of fall detection), forward that alert with the trigger sensor data, and a second level analysis at the server 20 used to refine the detection and reduce the number of false positive detections. The refinement may be global or specific to the individual or location. For example, an inspector in the field may have a first set of threshold parameters for triggering a fall alert while an employee who is known to be operating machinery on rugged terrain has a second set of threshold parameters. In another configuration, the system may have a first threshold parameter of detection utilized for a lone employee far from others and a second higher threshold parameter of detection utilized if it determines that there are a number of other individuals in the vicinity.

Figure 4A:
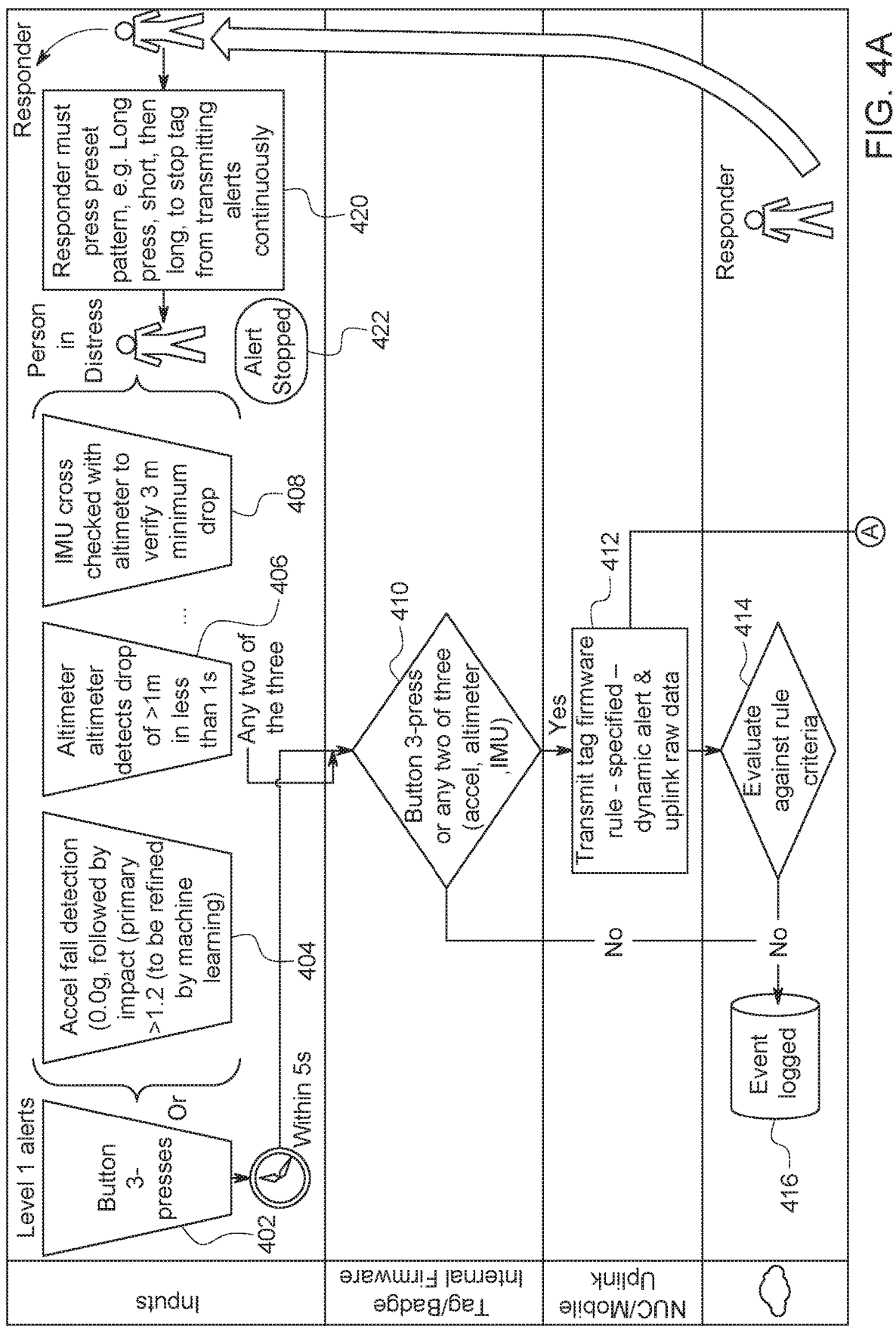
FIGS. 4A-4B is a high level flow diagram of a method of alerting nearby responders to render aid in response to a panic alert triggering or a fall detection.
Figure 4B:
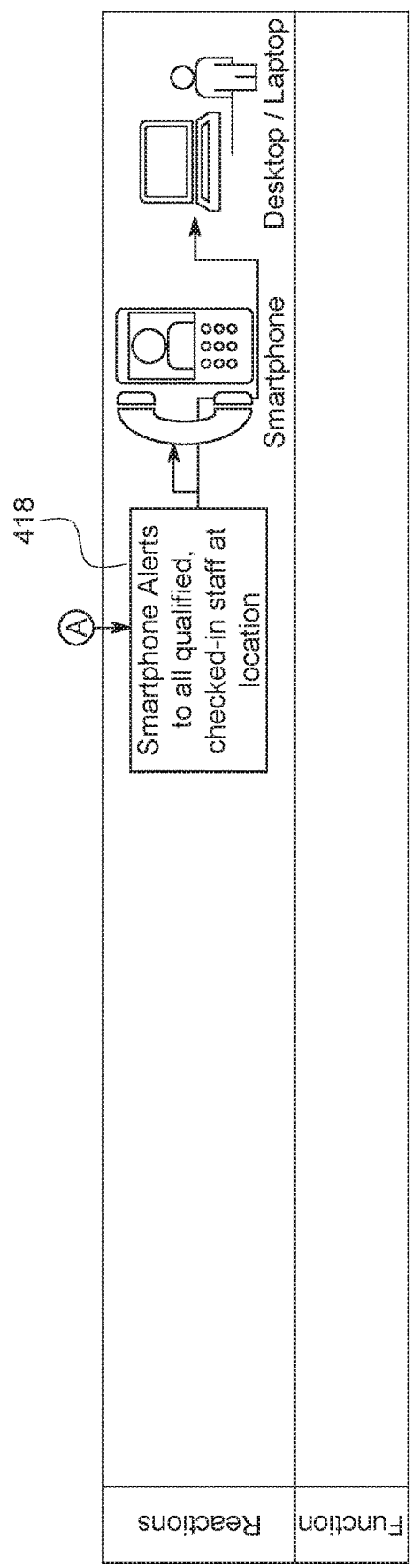

FIGS. 4A-4B show a flowchart detailing a particular method of alerting nearby responders to render aid in response to a panic alert triggering or a fall detection in a Level 1 alert scenario. System firmware in the tag 52 is configured to receive input from the panic button 74 and environmental sensors, such as accelerometers 66, 68, altimeter 72, and IMU 70. Panic button and sensor data inputs are processed by the badge firmware. The software is configured to detect various conditions, including a button press sequence, such as three presses within 5 seconds (402), and fall event conditions, such as detecting an acceleration followed by an impact greater than a threshold (404), detecting a drop of more than a minimum threshold in less than a specific time period, such as an altimeter reading of 1 meter in less than 1 second (406), and an IMU sensor reading indicating a drop of more than a minimum distance, such as 3 meters. Other conditions can also be detected as noted above. If the tag software detects a panic button sequence or at least a subset of the fall event conditions (such as detecting 2 of 3 possible fall indicators or 2 or 3 of 4 fall indicators) (410), the system will implement an internal dynamic alert rule to transmit the alert and relevant raw data (such as the various sensor readings) to be received by an infrastructure component 40 within range. (412). The tag can also transmit raw sensor data, such as the sensor data which resulted in the triggering of the alert and perhaps data collected for a specified time period before that triggering. The raw data can also be forwarded through the network to the server. Alternatively, the tag can spool the raw data and provide it when requested, such as in response to a request issued in reaction to an alert. Optionally, an upstream element, such as server 20, can further evaluate the alert data against additional rule criteria (414) to determine if the alert should be acted on, for example determining if a received fall alert is a false alarm should be ignored because the person associated with the tag has been assigned higher thresholds. Even if the tag does not trigger an alert, relevant data can be sent at that time or later and the server 20 receiving the data can log it even if an alert is not acted on. (410, 416). When a fall or panic button alert is received at the server 20, alert notifications can be sent to all designated recipients, such as individuals who are (a) qualified to respond to the alert at issue, and (b) have checked-in or are otherwise located at or near the relevant area. (418).

Preferably, the infrastructure units 40 include their own internal computational functionality and operate to calculate location of the tags 52, filter and/or provide other limited processing of alert and other information received from the tags 52 before forwarding the information to upstream local NUC or similar computing appliances which then forward data to the server 20 in sequence. This reduces the overall load on the server 20 and allows for use of local badges with more limited internal processing requirements as well.

The set of individuals alerted in response to a panic button press can be dynamically generated by the system. In one configuration, the location of the tag for which there is a panic button press can be used to dynamically determine a set of individuals to alert from a group of potential candidates. For example, the system can limit alerts to members who are on-site and who have specific attributes as stored, e.g., in a staff/employee database, such as rescue, medical or fire training. The alerts can be further limited to those that are within a specified distance or calculated travel time (e.g. obtained via an API from Google Maps or calculated walking or driving time, accounting for roads available, traffic lights, corridors, stairways, time of day related congestion, etc., within a campus) from the individual. The location of the badge triggering the alert can also be used to determine whether the physical site may require responders with specific capabilities/training or security clearance to obtain access, and this information used to determine where the alerts should be sent. An individual who receives an alert notice is preferably given an option by the application software (in an app or via a remote web page or application accessed over a network), to affirmatively decline to respond. In response the system may select an alternative individual(s) to send the alert to or escalate the alert to a larger pool of alertees.

If an affirmative response to the alert from a responder in the first group of alertees is not received by the system within a designated or calculated period of time, follow-on alerts can be triggered to expand the list of alertees to include a wider array of individuals, progressing ultimately to 911-local emergency services by voice, SMS or whatever automated means local emergency services prefer. In addition, the system can also resend alert notices to members who had received an alert initially but did not affirmatively decline or otherwise respond within a rule based time frame.

Responders to alerts also preferably have their own individual badges. In one embodiment, the system automatically determines whether and when a tagged responder arrives at the side of the individual who signaled the alert. The alert can be cleared or reduced in severity at that time or when the responder begins to enter checklist or other information from the scene. The responder who has arrived can then verify or confirm lack of duress and indicate whether the employee is injured.

According to a further aspect of the invention, and with further reference to FIGS. 4A-4B, the system in an embodiment is configured to improve on conventional reliance on telephonic responses by ensuring, among other things, a) that a visual confirmation of the person's well-being has been performed and b) that the alerting person is not under duress. In this configuration, when an alert is triggered the system processes it and alert notification are sent to one or more potential responders as noted previously (418). Preferably, the badge or badges 52 from which the alert has been triggered is configured to continually signal the alert until a preset pattern of presses (which may be different from the pattern to trigger a panic button alert) has been entered on the panic button of the putative victim's badge. After the signaling tag detects this button press pattern (420), it discontinues its alert condition (422). Alternatively, the badge 52 may signal the alert only once and be configured to send an Alert Clear signal upon detection that the designated pattern has been entered. When the server receives this signal, it then clears the alert. In a further alternative, the pattern can be entered on the badge of the responder, not the triggering badge. The responder badge will then send an alert clear message to the server which, in response, clears the alert from a tag in the vicinity of the responder badge.

Thus, a rule can be configured to determine if an additional badge has been detected in close proximity to the alert badge. This can indicate who may be assisting the individual of the alert badge if alternative means of communication is not present. It can also indicate whether the alert disable pattern may have been sent by the wearer of the alerting badge themselves to signal a false alarm. For example, the individual may have dropped their badge from a large height and the impact triggered a fall alert. The tag can be configured with different patterns to disable the alert because it has been responded gto or to disable it in the event of a false alarm, and a different pattern entered by a responder. A further pattern can be provided to trigger an escalation of the event if the responder requires assistance. For example, the tag can be programmed to detect a Morse-code S-O-S pattern entered on the panic button and in response signal a higher severity alert to the system. Alternatively, the tag can send the button press patterns and the server would process that data to detect this (and other) patterns and respond accordingly.

Figure 5A:
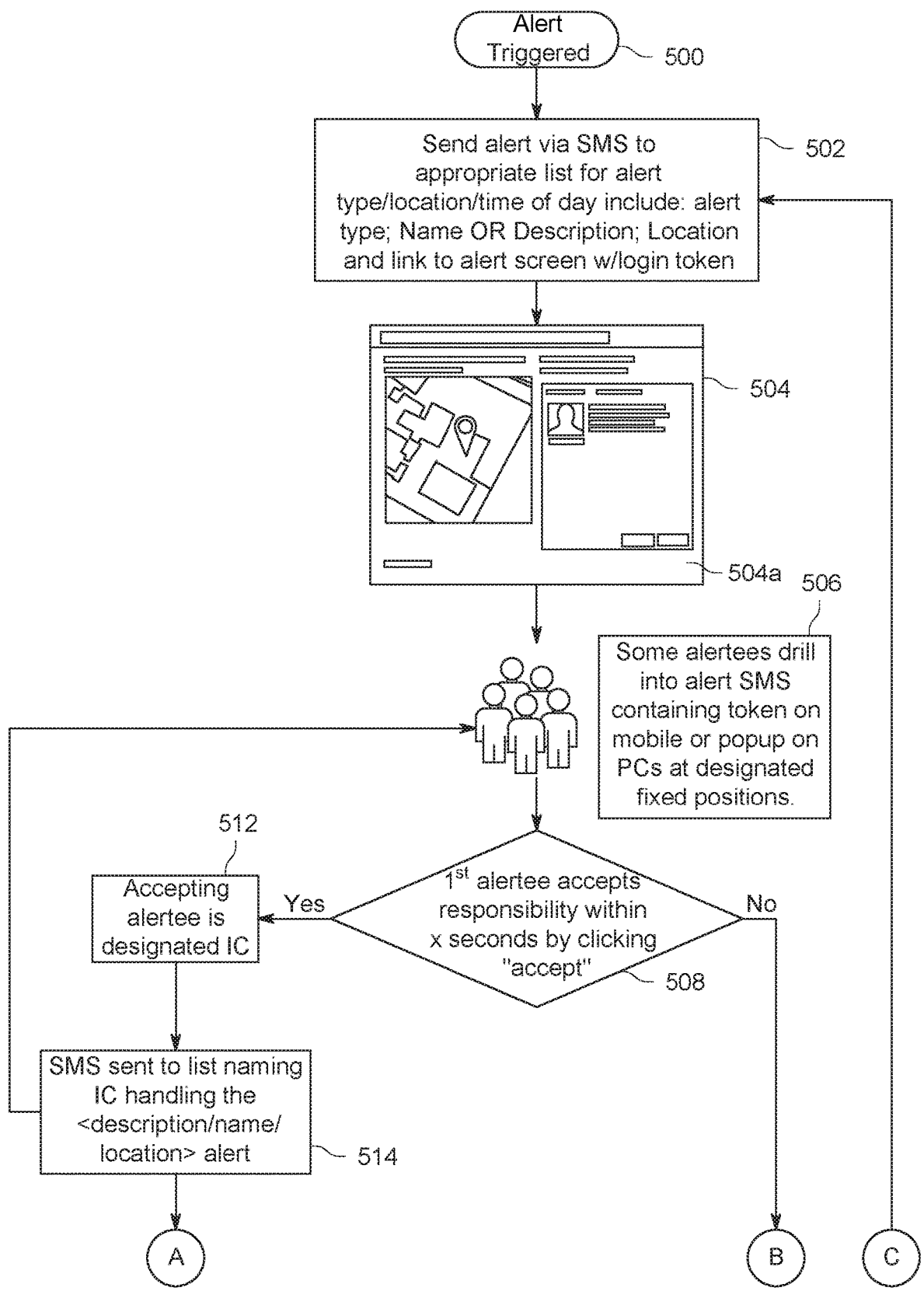
FIGS. 5A-5C show a flowchart detailing a particular method of alert handling.
Figure 5B:
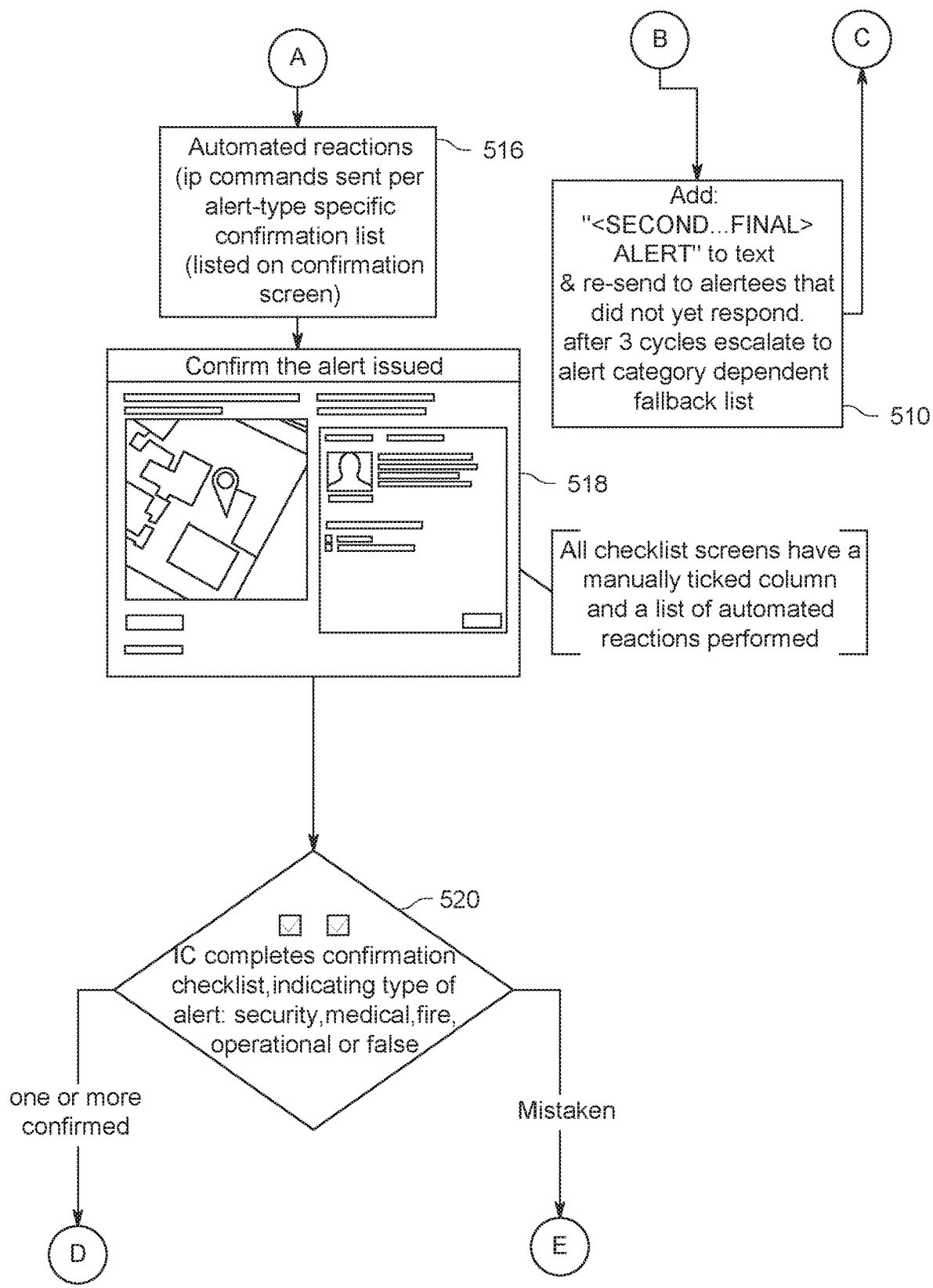
Figure 5C:
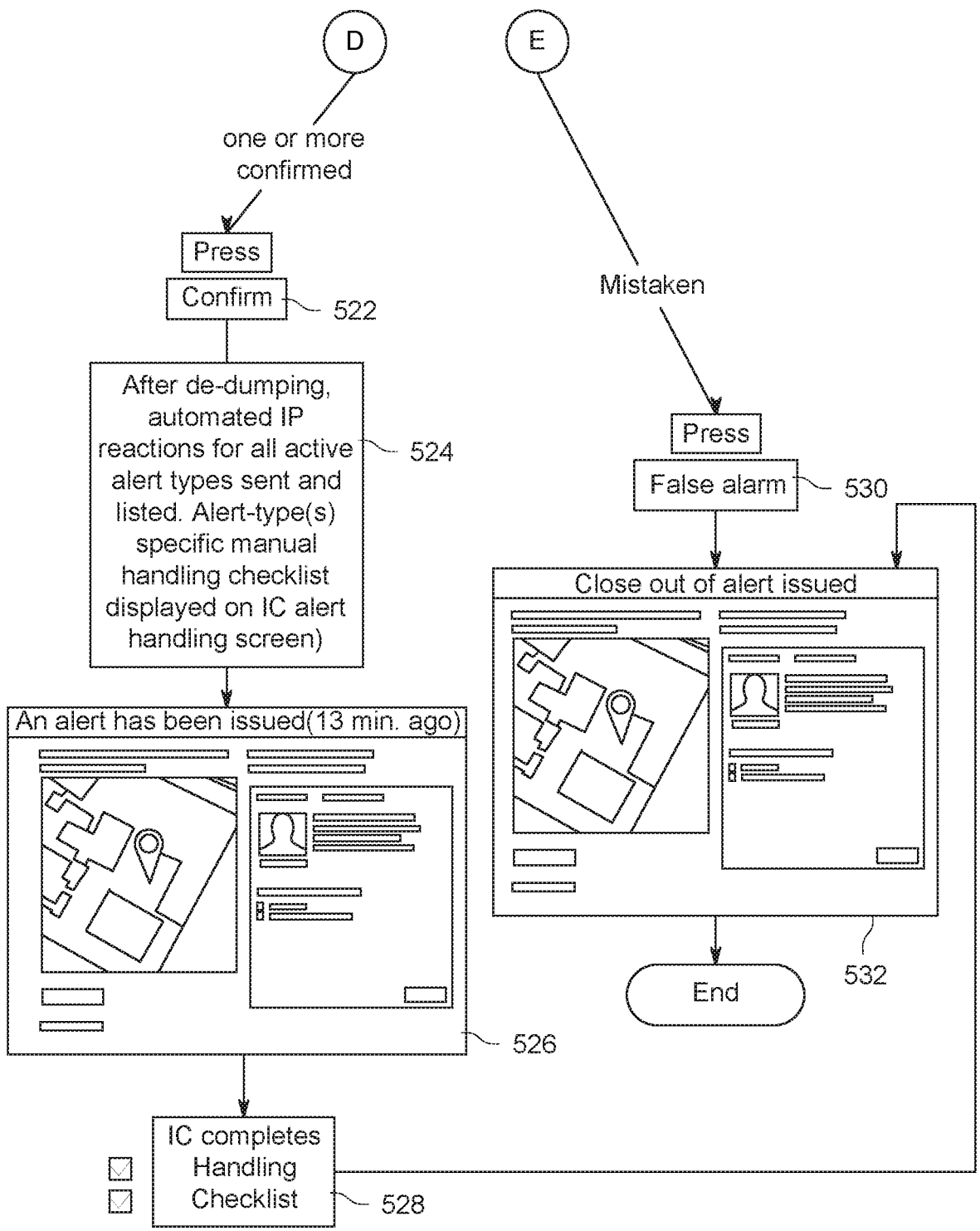
Figure 5D:
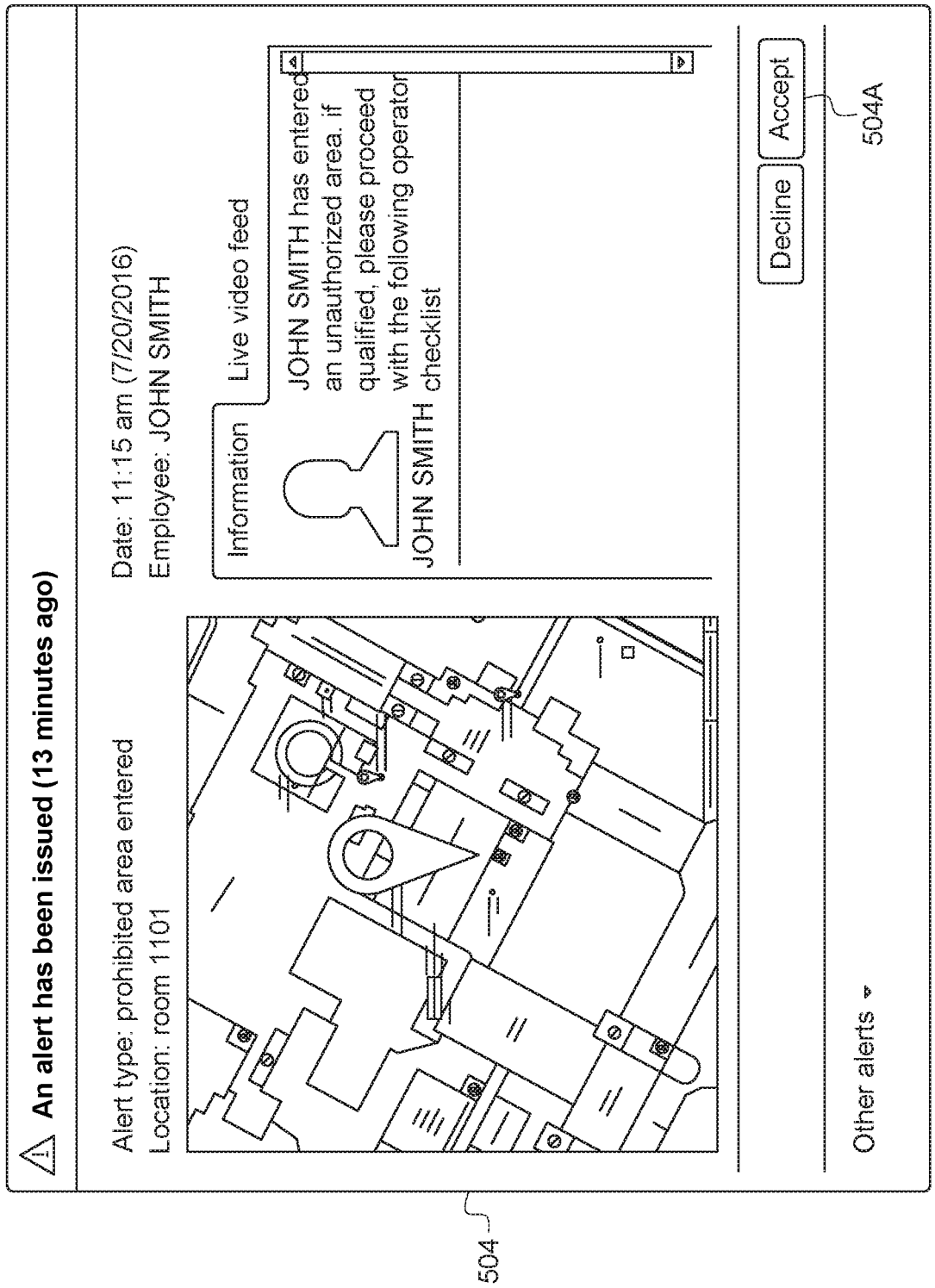
Figure 5F:
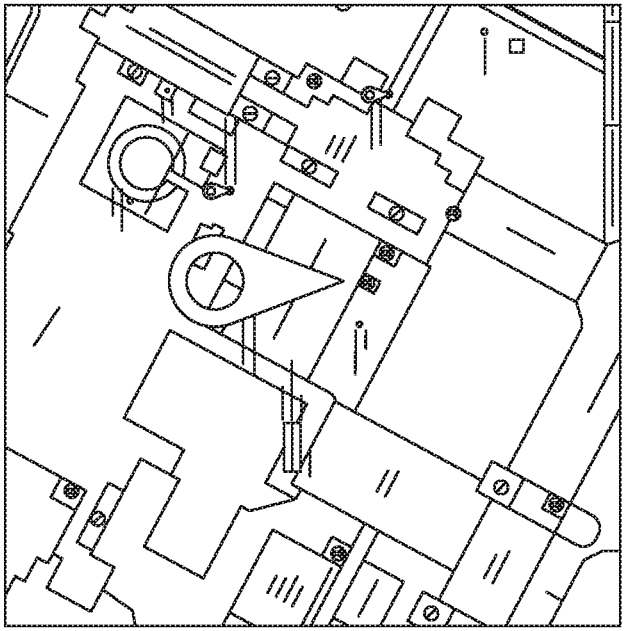
Figure 5G:

FIGS. 5a-5c show a flowchart detailing a particular method of alert handling in which the system requires that alerted individuals affirmatively accept responsibility for given responsive tasks and for processing task checklists to ensure that tasks are completed and incomplete tasks are reassigned. FIGS. 5D-5G are detailed views of the display screens shown in FIGS. 5A-5C; With reference to the figures, after an alert is triggered (500), the server 20 will send the alert to an appropriate static or dynamically generated list of individuals who are appropriate responders (502). For example, the alert can be sent by SMS to a designated phone or tablet device of one or more predefined individuals or recipients can be selected from a set of individuals who have been determined to be within a certain distance or other level of accessibility to the source of the alert. Information about the alert, such as when it was issued, where, the type of alert, and the individual associated with the alert can also be provided. Information received by a responder device can be displayed on a screen generated by appropriate software on the responder device. Block 504 shows a sample alert screen displayed on a designated responder device when a recipient of the alert opens it. In addition to alert information, the alert screen can contain accept or decline buttons 504a.

There can be multiple recipients of an alert and one or more can open the alert on their device (506) using a suitable interface. A recipient can accept or decline an alert action request, such as by pressing an accept or decline button 504a on a user interface display and the user APP will then send a corresponding message back to the server 20. If the server 20 does not receive an accept within a time threshold (508), the server 20 resends the alert, possibly adding a SECOND alert notice or other indication to alertees that have not yet responded (510) and the system again waits to receive responses (508). This process can repeat one or more times, possibly resending the alerts as FINAL and if no response received after a set number of cycles, such as 3, the alert can be transferred to a fall back list or escalated. As an alternative to a system rule to determine if the alert is not cleared within a specified period of time and, in response, escalate the alert status, a similar function could be programmed within the tag firmware as well.

If the server 20 receives an alert accept message from a user device (508), the accepting alertee is designated as the one in charge (IC) (512). An update message can be sent to the other alert recipients informing them of the IC for that alert (514). Certain types of responses can be associated with an automatic and/or default list of responsive actions that need to be taken. If there are automated responses, they can be sent (516) and a checklist of initial confirmation actions that the IC individual should take presented on the IC's device (518).

The IC may also be asked to confirm whether the alert is real or a false alarm. Also, the IC can be asked to provide information to categorize or confirm the type of alert situation (e.g., alert, security, medical, fire, false alarm.)

If a false alarm is indicated, such as where the IC presses a False Alarm button on their display and this status sent to the server (530), the server then sends an update to the designated responders to close out the alert. (532). If the alert is indicated as being real (522) the server can retrieve and transmit a checklist of actions that the IC (and perhaps other responders) is expected to perform in responding to the alert. If multiple alerts are at issue and/or more than one responders, a de-duping process can also be performed.

The user device APP receives the checklist and displays it (526). The responder can then check off actions on the list as they are performed. This indication is sent to the server 20. If multiple individuals may have been tasked with the same action, an update can be sent to the devices for those other people specifying that the action has already been completed (by another) and this indicated on their display so that they know not to repeat that action unnecessarily. After all checklist items have been completed (528) the alert is closed out (532). A time out period can also be implemented at the server to escalate and/or reassign checklist items if they are not completed within a specified period of time.

According to a further embodiment, to allow for personnel to more easily locate the person needing assistance, a badge can have an audio output signaling when an alert has been triggered. The audio output may allow the badge to be more easily located by a responder. A flashing light on the badge can also be provided for similar purposes. Instructions for a responder can be sent to a badge with an electronic display such as e-Ink or other display technology. Audio messages can also be output. Such messages may be pre-recorded and stored within the badge and played automatically or in response to a signal originating externally, such as at the server. The badge may also include functionality to receive and output audio signals originating remotely.

In a particular embodiment, as noted earlier, the system architecture implements a multi-track data evaluation in which several different levels of data collection and processing are provided to minimize response time and reduce the overall load on the server. This architecture is illustratively disclosed in FIG. 6a In this configuration, Level 1 is comprised of an individual's badge 52 that is configured to react to information from its internal sensors in accordance with Level 1 rules 602 stored therein, such as rules to detect when an individual has fallen, and then in response sends an alert to a local infrastructure units 40, such as a nearby unit 606. Data can also be sent as discussed above.

At level 2, the infrastructure units 40 receive data and alerts from nearby badges as well as input from other tags, sensors, and input devices that are within range. A set of level two rules 608 are stored in these devices and used to signal alerts for conditions that are based on the richer set of available information at this level. Level 2 devices can also be configured to pass received level 1 alerts upstream. However, the Level 2 unit can be freed from the lower level processing done within the badge to detect badge-specific alert conditions.

At level 3, the alerts and other outputs from the level 2 units are passed through a network and processed by the back-end server 20. The server 20 can also receive input from other devices, such as cameras 612. The server 20 operates according to a set of level 3 rules 614. As discussed herein, the server can use a set of level 3 rules to provide further functionality in addition to responding to level 1 and level 2 alerts it receives. The server can then output its own set of Level 3 alerts 616, send messages to appropriate individuals, control equipment, etc., as discussed herein.

FIGS. 6B-6C show a flowchart detailing a particular method for using multitrack data evaluation to minimize incident response times and which illustrates distributed data collection and processing aspects of the present system and methods. As illustrated, the badge system collects data from its various internal sensors (70-81). As a Level 1 device, the processor 62 in the badge 52 evaluates this data to validate actual or potential high priority alerts based on the tag sensor data and internal clock 76 alone. (620) This information is then forwarded to the local infrastructure NUC/Mobile uplink 606 which also has access to other localized data, such as location of the unit and the tag, information about other badges/people in the same area, as well as time and date information. Level 2 processing can be done at the NUC/Mobil uplink hardware and software to trigger high priority alerts that are dependent on the location of others in the vicinity. (622) For example, a level 2 processer can be configured to trigger an alert if an individual is in the region during specified days/times (such as after hours) or trigger an alert where the number of detected badges in a given area is less than a predefined minimum number of people required for safety purposes. By offloading some of the rule processing to the badge (level 1) and the level 2 infrastructure, high priority alerts can be detected and signaled more efficiently and load on the downstream processors, such as server 20, is reduced.

Relevant information can still be backhauled to the server 20, which functions as a Level 3 processor to analyze information collected and forwarded by the various badges/tags via Level 2 infrastructure units along with a set of additional information that may be accessed via a Level 3 database or connection to a system user's ERP or other databases 624. This information can include, for example, details about attributes of each individual or asset associated with badges/tags such as their job role or group and employment status, security clearance, training level and qualifications, schedule and locations where they are expected to be, etc. Additional information about the facility may be drawn upon, complex rules with parameters external to individual facilities can be applied, etc. (626) Alerts triggered and the raw data underlying them can be logged in storage 628 for later queries and reports.

In a particular variation of a multi-track alert analysis, input from multiple sensors in the tag 52 and other inputs outside of the tag can be used to identify potential instances of workplace violence. A badge 52 can detect a combination of a panic button triggers (or several triggers) and/or process sensor data, such as discussed above for a call, to detect a hard impact followed by rebound and/or sudden drop detected by altimeter. This condition could alternatively be detected by level 2 or level 3 hardware analysis. Further conditions such as detection by the tab or a tag monitoring device cessation of movement and/or loss of signal from a badge can also be detected. These combinations of factors can be used to trigger an alert of potential workplace violence. In response the system can identify a CCTV video feed of the area in which the alert was triggered and automatically this video feed to an operator to provide for visual evaluation of the situation.

Figure 7A:
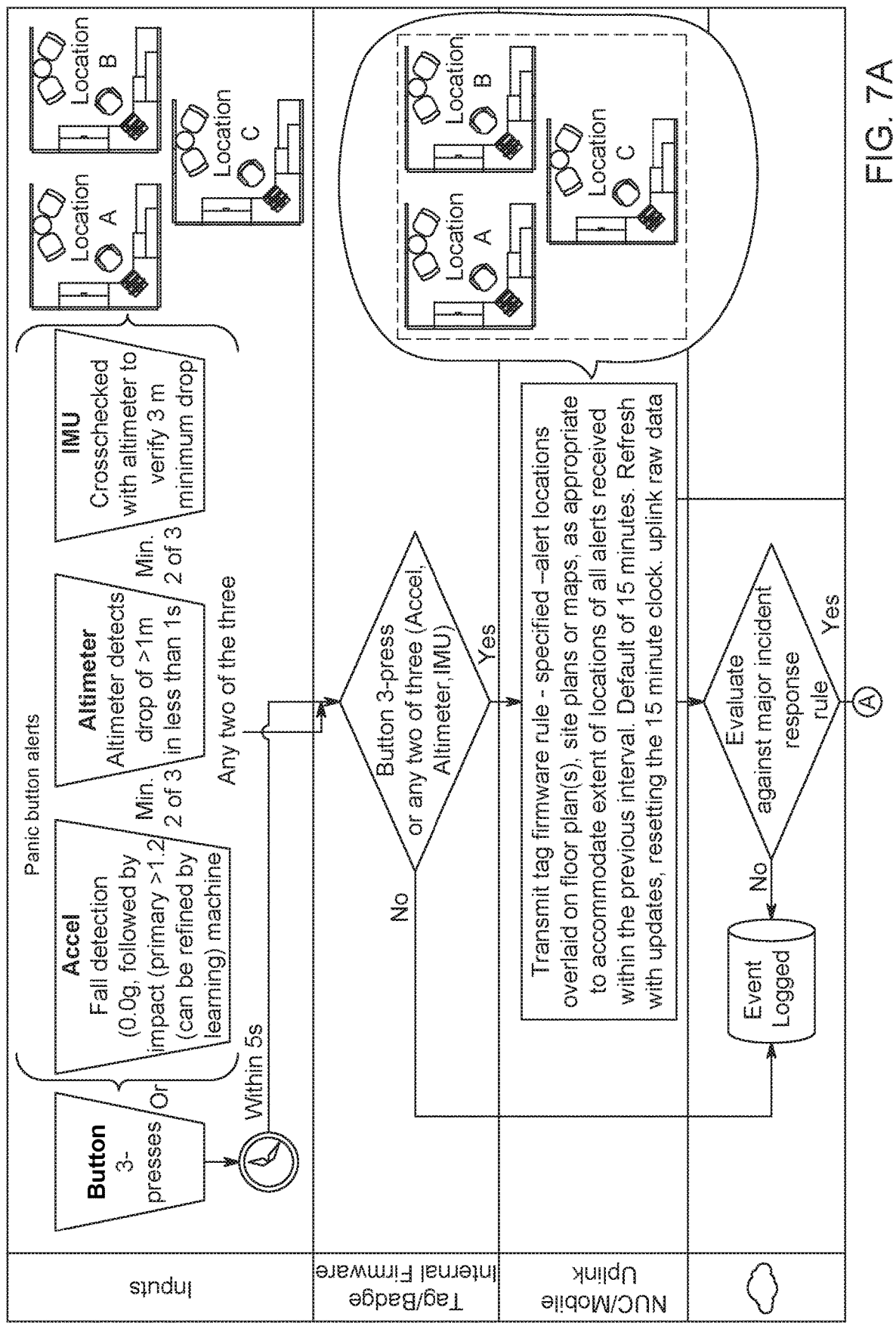
FIGS. 7A and 7B show a flow diagram detailing a method of crowd sourcing the magnitude and extent of an incident according to an embodiment.
Figure 7B:
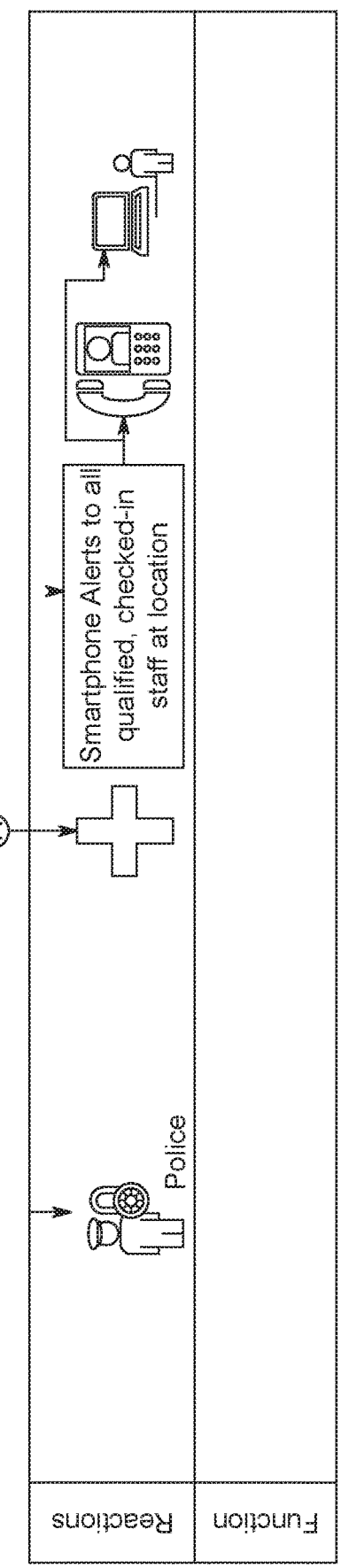

In a further embodiment, detection and analysis of alerts triggered from multiple badges can be used to crowd source information about the magnitude and extent of an alert. FIGS. 7A and 7B show a flow diagram detailing a particular method of crowd sourcing the magnitude and extent of such an incident. In general, badge generated alerts are received by the Level 2 infrastructure and then passed upwards to the central server. The volume of alerts received over a given interval, the timing and geographic location of the alerts, and the nature of the alerts is used to identify conditions that may involve a number of individuals or a large area. For example, an active shooter situation may result in many individuals in a specific area triggering their badges nearly simultaneously. A floor filling with smoke or an active assailant on the move may result in panic buttons being pressed in a sequential 'wave' moving through the floor as the incident's focus moves. The crowd sourcing can also use information that would not otherwise trigger an individual alert. For example, sensor data sent by badges can indicate panic button presses even if the button has not been pressed in a manner to trigger the panic button alert at the tag. The upstream system can detect whether multiple badges have had panic button presses within a specified time period. Multiple panic button presses on many badges can trigger an alert for a wide spread or largescale incident, such as an active shooter situation.

Turning to FIGS. 7A and 7B, tags in various locations can be configured to trigger an alert e.g., in the event of a fall or panic button press as discussed above. Second level infrastructure is configured to receive tag information from the various tags in a specified geographic area that can span multiple locations, such as several adjacent rooms in a building. In this embodiment, the second level processing is configured to detect when more than one alert (or more than one alert of a given type) is received within a given time period, such as multiple alerts received within a 15 minute period. If this is detected, a secondary alert can be triggered at the level 2 device to indicate that the situation may be widespread.

Receipt of this secondary alert at the server 20 can be used to trigger a major incident response rule. A major incident response rule, in one configuration, triggers the server to send smart phone alerts to qualified, checked-in staff at the site location, send alerts to emergency first responders can be alerted, and notify others as appropriate. etc. Information about the alerts can also be displayed to a system user on mobile user tablet devices or fixed location computer displays.

In one configuration, the alert locations and timing are be shown overlaid on a floor plan of the location at issue. Bounding rectangles around incident sites can be shown in color and change color to indicate how much time has elapsed since the information has been updated. For example, if the data shown was received within 5, 10, 15, or 20 or more minutes, bounding rectangles can be shown in red, yellow, green, and blue respectively. Advantageously, this allows a viewer to quickly determine the currency of the information displayed.

Further functionality can be provided by integrating COTS gunshot detectors and analyzers that detect acoustic signatures and optionally the direction of gunshots. Input from these devices can be supplied to the system at Level 2 or 3 Level. The system is configured to correlate the acoustically determined danger zone as indicated by the data from the gunshot detectors with the locations where panic button presses have occurred. In response, the system sends control signals to automatically lock down all rooms and doors within a specified area that encompasses the active assailant's region of activity, preferably with an additional buffer zone, such as a smallest rectangle encompassing all triggering events with an extra 100 foot buffer around its perimeter. Police and other authorized responders can be given special door releasing tags that will allow them to enter areas that are locked to others. Further, instead of locking all doors in the area, the system can lock one or more selected areas while leaving doors and/or other access barriers along pre-mapped escape route unlocked for an additional period of time or when triggered by an authorized user.

As will be appreciated, integration of the acoustic gunshot detection with video and automatic validation of badged individuals allows for presentation of a rich set of data that can be used by emergency responders to identify where best to apply resources, where people may be trapped, etc. For example, the server 20 can be configured to generate an emergency display that shows the location of the detected gunshots and the number of detected shots along with caliber range. The number of unique Panic button presses per defined or selected zone can be displayed to assess the magnitude of the situation. The system can further be configured to determine and display other data such as time since trigger of the alert and since last shot was fired. Mapping of each shot detected and triangulated can be enhanced by utilizing indicia such as color to show where the oldest to the most recent activity has occurred.

In a conventional CCTV system, security staff can monitor video for secured areas. However, when the video shows individuals in a secure area, security staff may find it difficult to determine whether those individuals are allowed to be there and so initiate a manual verification process, such as by sending a guard to physically investigate.

Figure 8A:
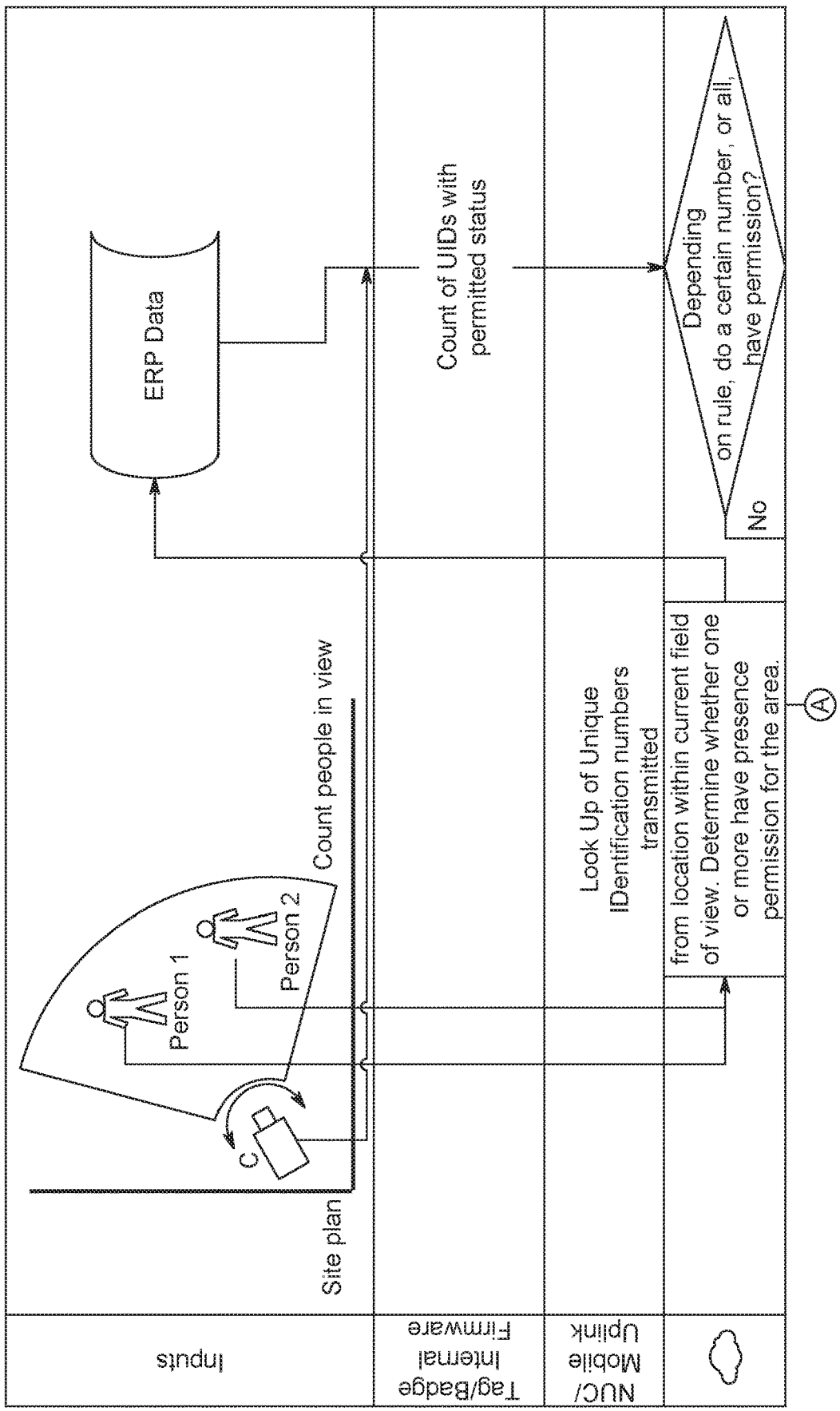
FIGS. 8A and 8B show a flow diagram detailing a method of reducing false alarms and additional verification of potential security violations according to an embodiment.
Figure 8B:
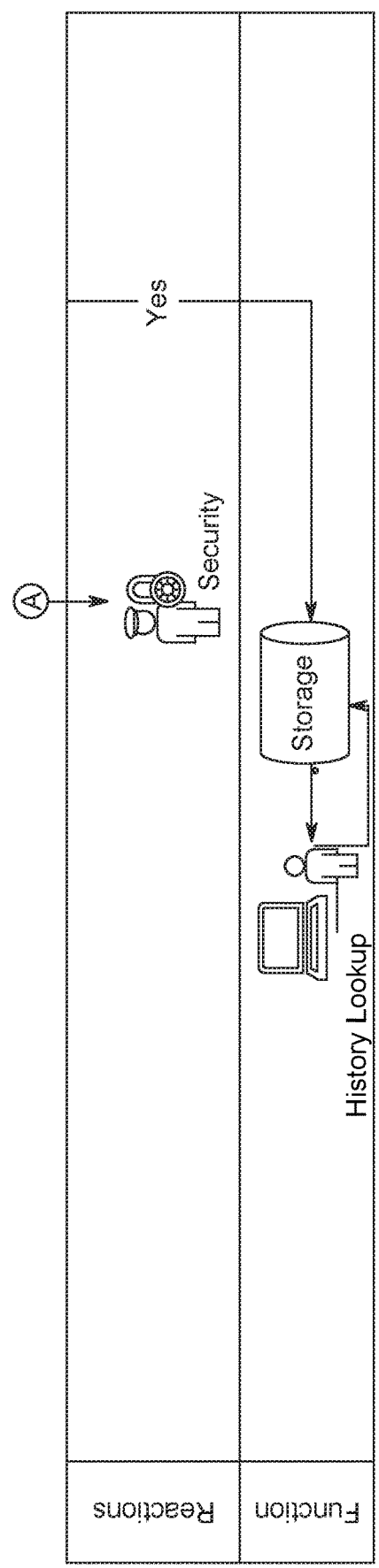

FIGS. 8A and 8B show a flowchart detailing a particular method of reducing false alarms and additional verification of potential security violations according to a particular embodiment. In this embodiment, the system is integrated with an intelligent CCTV security system and software that analyzes video images to detect the number of individuals shown in a given field of view. Suitable video imaging analysis software will be known to those of ordinary skill in the art.

When one or more individuals are detected by a secondary monitoring system, such as a video or other camera system, the system 10 combines this information with data indicating the tags detected in the area shown by the camera. The user IDs' for those tags are accessed and security rights checked to determine whether those individuals are authorized to be there. The system can compare the number of people shown on the video to the number of detected badges. If the numbers are the same and all have authorization to be there then no further verification is needed by security, no alert is issued and the detection data is simply logged. Likewise, if more individuals are shown in the video than authorized badges but a detected badge is for a person authorized to escort unbadged or individuals who are permitted access only if accompanied, no further verification is needed. Conversely, if more people than badges are detected and no exception allowing this is defined, the system will then trigger a security alert that requires reaction. In addition to triggering a security alert, the system can also take further steps such as triggering remote locks to prevent additional access.

Thus, the system has the ability to check for authorization status of persons at any CCTV monitored location automatically. Permissions can be set not only by area, but by time of day and day of week as well. In many instances, video images are not clear. Advantageously, in this embodiment, unclear video images depicting a number of people can be automatically crosschecked with a count of authorized badges in the pre-mapped field of view of each CCTV camera equipped with video analysis. The system can use this to automatically confirm whether or not the one or more imaged individual(s) are authorized to be at the monitored location. To allow the process to be fully automated, non-permissible areas for various groups of employees and/or individuals can be designated during system commissioning to coincide with existing or newly installed camera arcs of view.

This auto-validation of personnel present in a restricted area according to this aspect of the invention can therefore greatly reduce false alerts requiring security staff attention, thereby enhancing response when bona fide alerts are triggered.

Figure 9A:
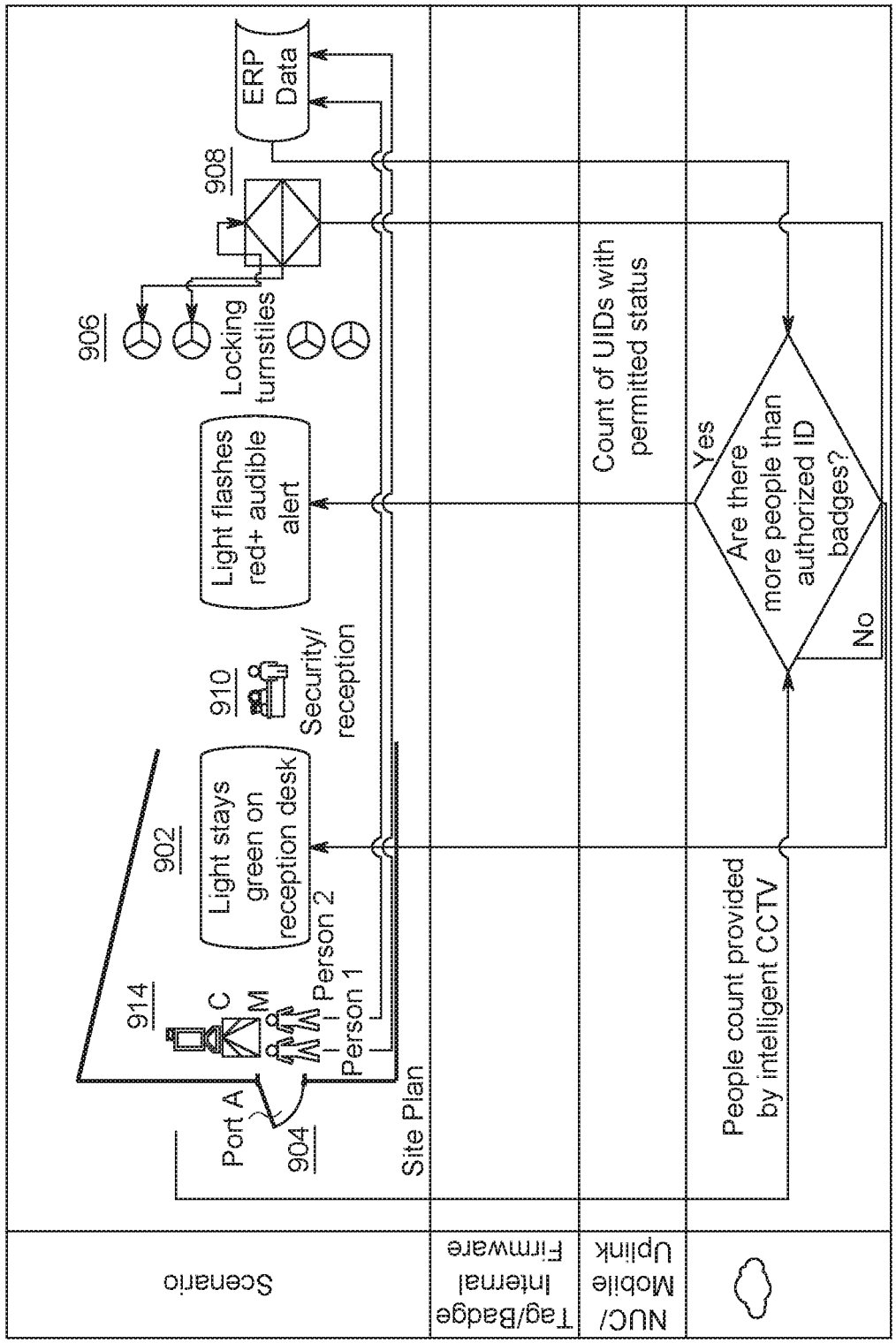
FIGS. 9A and 9B are flow and block diagrams of functionality in an embodiment for controlling locks and other equipment to provide secured access to a location.
Figure 9B:
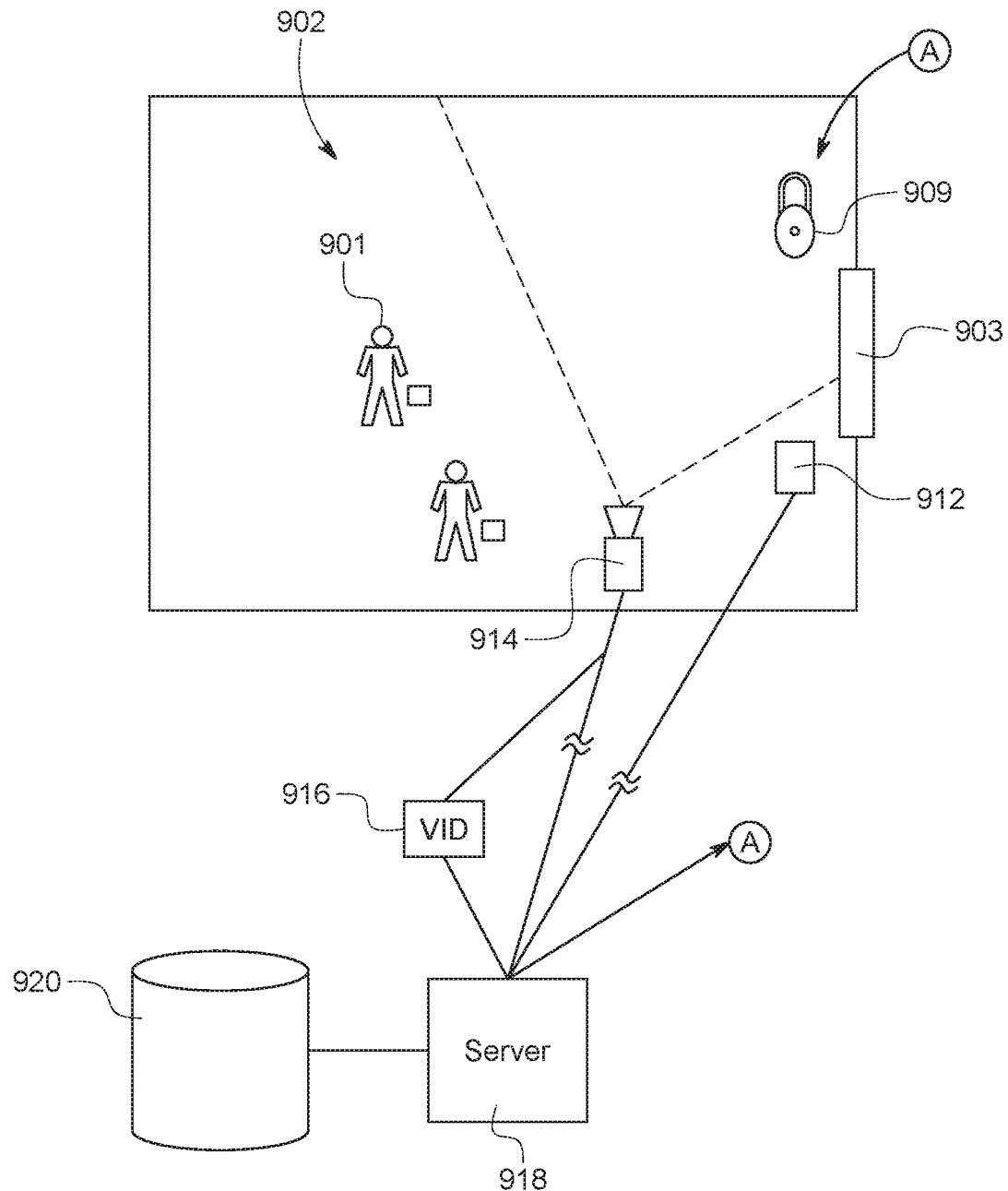

Conventionally, automated access to electronically locked doors and other entry barriers is provided by a 'badging in' system wherein a security badge is swiped through or past a panel with a magnetic stripe or RF or optical scanner. If the card indicates the person is allowed to enter, the system releases the lock to allow them to pass. However, it is difficult to prevent people from piggybacking entry by entering the room with someone else who has already badged in With reference to FIGS. 9a and 9b, and according to a further embodiment, the system is configured to control locks and other equipment to provide secured access to a location while reducing opportunity for piggybacked access and addressing other security issues when multiple individuals are seeking entry at the same time.

A main entrance to a campus or secured area 902 may require access through an entry barrier 903, such as a door 904, turnstile 906, elevator 908, or similar entry barrier with a mechanism 909 that can be locked, disabled, or restricted to prevent or limited entry. The mechanism 909 can comprise a physical device, such as a mechanically actuated bolt or magnetic lock that can be activated to prevent a lock a door or turnstile, a traffic gate or vehicle barrier, or other mechanism. The mechanism 909 can alternatively be implemented in software to limit operation of an access device. In one embodiment, the system operates to prevent an elevator from leaving the floor or limits elevator functions to prevent the elevator doors from opening at restricted floors. The area can monitored by local (or remote) security personnel 910 or be unmonitored. If monitored, as an alternative to automatic operation of barrier 903, the server 918 can signal an 'OK' to a security guard, such as by activating a light at a security desk, and the guard can manually allow access.

Remotely readable tags or badges 901 are provided that each have a unique tag ID and that can be read by one or more suitable tag readers 912. Tags 901 can include additional functionality such as sensors and internal processing as addressed above with respect to tags 52. Likewise, reader 912 can be implemented within a remote infrastructure 40 that provides additional functionality, such as tag triangulation to provide a more accurate location and communication with tags 52. The reader 912 can be near the entry barrier 903 and visible or hidden from sight. If entry barrier 903 is an elevator 908, a reader 912 can be placed by the call button, inside the elevator cab, or in both places.

A computer 918, which can be local or remotely accessed through a network, and which can be a more general server or a dedicated device, receives information from the readers 912 and issues signals to control the mechanism 909 to e.g., open or lock doors or permit or restrict access to specified floors via elevator. The server could be operating as server 20 in connection with a system 10 as discussed above, operating as an independent device, or be positioned in a network stream from a more general server 20. Computer 918 can be configured to store some or all of the information, such as access rights for individuals, access rules, etc., that is needed to perform the functions address herein. Locally stored information can be periodically refreshed by querying a remote device or receiving a push message so that authorization security information is kept current.

A database 920 is provided which contains information linking tag IDs to the individuals the tags are assigned to and the access rights of those individuals.

One or more cameras 914 that provide video of at least part of the restricted area can also be provided. The video signal can be sent to the server 918 for processing or sent an intermediate system, such as an intelligent video analysis system 916 that analyzes the video using conventional methods to determine the number of people in an in an image and optionally the location of each person shown in the video relative to the imaged area. Similar analysis can be done by the server 918 if the video is not analyzed elsewhere to determine the number of people present in the field of view and optionally their location in that area.

In this embodiment, the server 918 is configured to evaluate the access rights of all individuals in the given area 902, such as an entry way or distance from the barrier, or within an elevator. If all detected tagged individuals have access rights then the server 20 can signal mechanism 909 that the barrier 903 be unlocked or enabled as appropriate. If a detected tag is determined to be assigned to an individual that is not authorized, the server 918, in one configuration, signals that the barrier 903 be locked (or does not send an unlock command) until the system detects that the unauthorized individual is at least a minimum distance from the barrier 903 so as to prevent piggybacked access. Similarly, in an elevator implementation, the system can bar access to restricted floors if it detects that at least one unauthorized person is present in the cab, even if all other members are authorized.

A visual audio alert can be issued using a predefined message and/or a dynamically generated message to be played in the area 902 and that informs the individuals present of the security issue. In a dynamic message, an unauthorized individual can be identified by badge number, name, or other indicator. The visual or audio message can generated by the server 918 can inform the unauthorized individual to step back from the barrier or to exit on an elevator on an unrestricted floor. Such a message can also inform other individuals who may be authorized that restricted access will not be provided until the unauthorized individual is no longer in the vicinity of the barrier or that elevator. Text messages can be displayed on local video monitor. Audio messages can be played on a local speaker. If the system associates a person's cell phone number or other device ID with the assigned badge, the message can be sent to the unauthorized individual as a text message, email, or other communication. A message can also be sent to other devices associated with those seeking access indicating the reason for access denial. If the tag 901 itself has audio capability, such as could be implemented in a tag 52 addressed above, the tag can be remotely triggered to play an appropriate prerecorded message or sound a tone or flash a light to alert the individual that they are not authorized for that area. If the tag supports receipt of audio messages, one can be sent to the appropriate tag and played.

The system can be configured to implement more complex security rules as well and the server 918 operate to restrict access until it determines that appropriate security guidelines have been met or are not being violated. In one configuration, the server is configured to only allow access if more than one authorized individual is present. Other entry access rules can also be implemented automatically. The system can detect that one person trying to enter has authority but only if accompanied by a supervisor, and further determine whether or not a badge for their supervisor is present. When the server 918 detects that this specific condition is met it can signal the barrier 903 to permit access.

In a further configuration, persons passing through entry portals can be counted using conventional person-counting mechanism, such as a turnstile rotation counter, pressure mats, eye beams, or video image analysis, such as head-counting camera systems. This entry count is provided to the server 918 which cross checks the count against the number of authorized ID badges detected. In the event of a mismatch the server generates an alert and can trigger security actions including producing visual and/or audible alerts, locking of access barriers, disabling of elevator operation or calling an elevator that may already be in transit back to the entry floor or other floor, such as one with a security guard. Other barriers that may be downstream from the area where the entry count was generated can be locked. For example, an entry configuration can have two access barriers, one where it is easier to count people passing by but where security easier to bypass, and a second barrier further on, such as an elevator, locked door or gate. As above, a message can be generated to inform those present of the issue. This feature provides a further security check in the event that initial access was obtained.

In yet a further configuration, the system employs video inputs, such as from a camera 914 combined with image analysis software to detect the number of people in an area. Conventional head counting cameras systems are available, as well as stereoscopic dual cameras with intelligent video, each of which can be well suited for this purpose. One or more such cameras are re mounted overhead, in front of, or otherwise directed towards the region of interest and image processing software provides automated detection of the number of people in a given area. The sever 918 receives information indicating the number of detected tags in the area and the number of people detected in the camera images. In response to a mismatch between the number of detected people versus number of detected authorized badges, an alert can be signaled and access barriers activated such as discussed above. Thus, for example, the system can detect when there are more people in a group trying to enter a secured door than detected badges or than authorized badges or detect when there are more people in an elevator cab than there are detected or authorized badges and react accordingly.

In a configuration where the access barrier comprises a door, turnstile or other passage, the access verification process can be done continually. Where the access barrier comprises an elevator that provides restricted access to one or more floors and floors are selected using buttons in the elevator, the access verification process can be initiated when one or more floors are selected and either before after the doors to the elevator are closed or during both states. The system can be configured to prevent selection of a restricted floor if it cannot confirm that every person in the elevator cab has access to that floor. If access is denied, the system can send a message to be output in the elevator identifying the security violation, such as an attempt to select a restricted floor where there is at least one person who does not have authority to enter. The system can further, similar to above, identify by badge ID or name the one or more people whose presence is blocking access and convey this information to an audio or video output device in the elevator, such as an elevator speaker or display integrated into the elevator, or to a badge or other device associated with one or more people in the elevator, such as a smartphone, and preferably at least the individuals whose presence is barring access to the floor. Access to the restricted floor can be restored when those blocking individuals are no longer detected in the elevator cab.

Certain newer elevators require users to select destination floors on a panel outside of the elevator and they will then be directed to a specific elevator to take to that floor. In a particular embodiment for use with such elevators, a reader is positioned in proximity to the elevator floor selection input, such as in a building lobby. The system limits floor selection based on authority of the person who has selected the floor. Thus, a person who does not have authority to access a given floor will not be permitted to select that floor as a destination. A short range reader is preferably used so that badges will only be detected when a person wearing the badge is standing in front of the reader. (Although not preferred, a contact reader, such as tap or swipe reader can be used in an alternative embodiment.)

According to a further aspect, the elevator control system determines elevator floor assignments with consideration of the access restrictions for the floor and may further consider access rights of individuals selecting the floors. The system is configured to group the floors each elevator is directed to in order to reduce or prevent instances where an elevator will be assigned to access both restricted and non-restricted floors in a single trip.

In addition, or alternatively, the system detects, using mechanisms discussed herein, whether each individual within the elevator cab has authority to access each floor that has been selected as an elevator destination. In one configuration, the elevator control system is directed to send the elevator to one or more unsecured floors before traveling to restricted floors so as to give unauthorized users (who may be the ones who selected the unsecured floors), the opportunity to exit. If only restricted floors are selected and the system detects at least one unauthorized individual in the cab, the elevator can be directed to remain on or travel to an unrestricted floor and not proceed until it detects that the unauthorized individual has left the cab. The unrestricted floor can be a floor that the elevator is already directed to or another selected unrestricted floor. As noted above, a message can be output indicating the security violation and identifying the individual(s) who need exit the cab.

When an attempt to access a secured location is prevented, the system can also send a message to one or more appropriate security staff informing them of the issue and requiring a physical confirmation to, e.g., manually check ID badges of all persons who had just entered. The alert message can be processed in a manner similar to that discussed above, where the recipient security staff is selected based on factors such as who is assigned to that area or who is closest (and preferably not within the group of that are actually seeking access to the location). Alert accept, response checklists, and alert clear functionality can be implemented in a manner similar to that discussed above for panic button, fall, and other emergency alerts. Thus, if an alert sent to a first selected security individual and the alert is not accepted in a predefined time period, the server can escalate or redirect the alert to a second selected security individual. In one configuration, the alerted security individual can clear the alert and thereby override the restrictions to permit access. This is useful, for example, to address situations where a badge is malfunctioning.

Figure 10A:
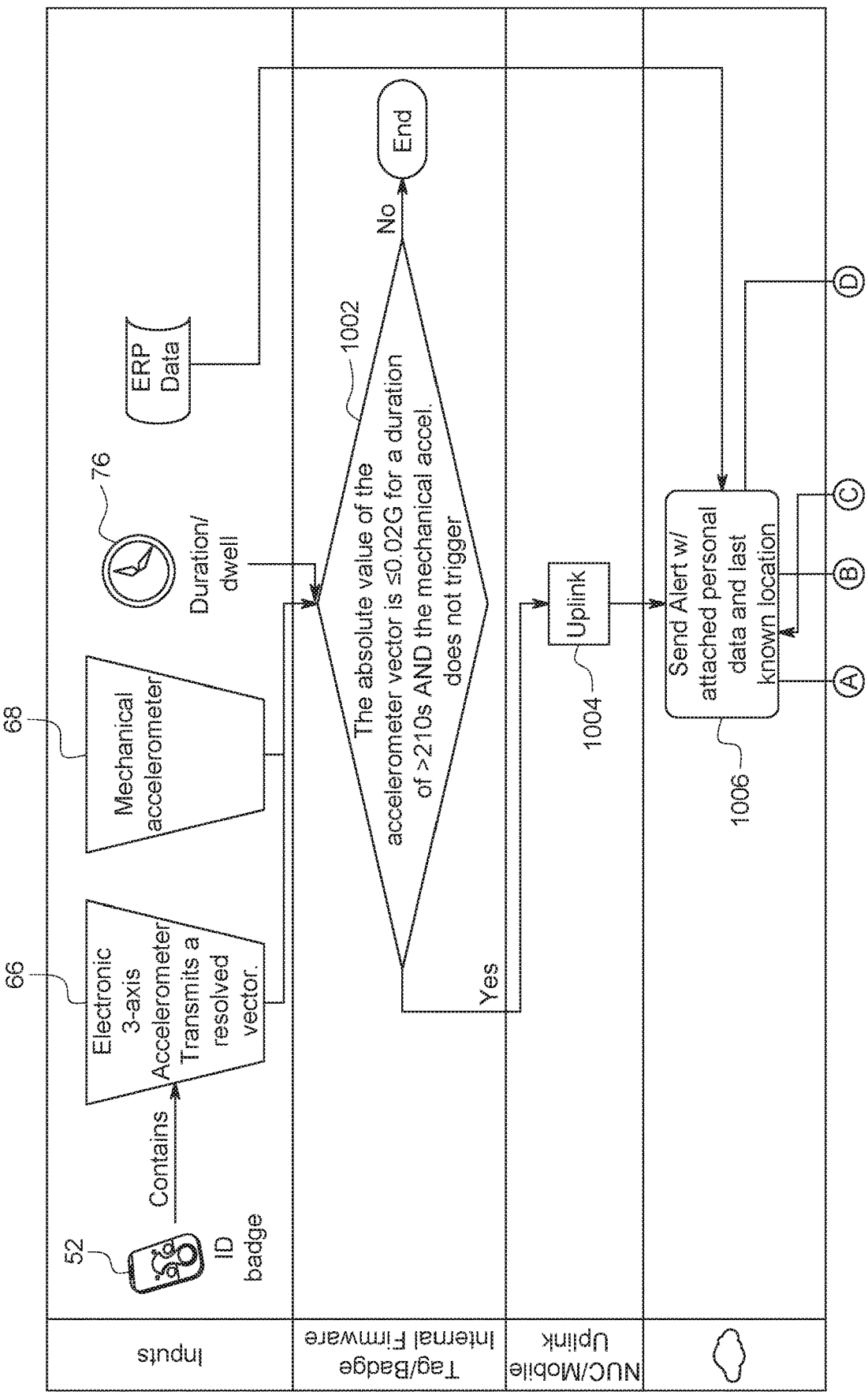
FIGS. 10A and 10B show a flow diagram detailing a method for determining when a wearer of a badge as discussed herein has stopped wearing it according to an embodiment.
Figure 10B:
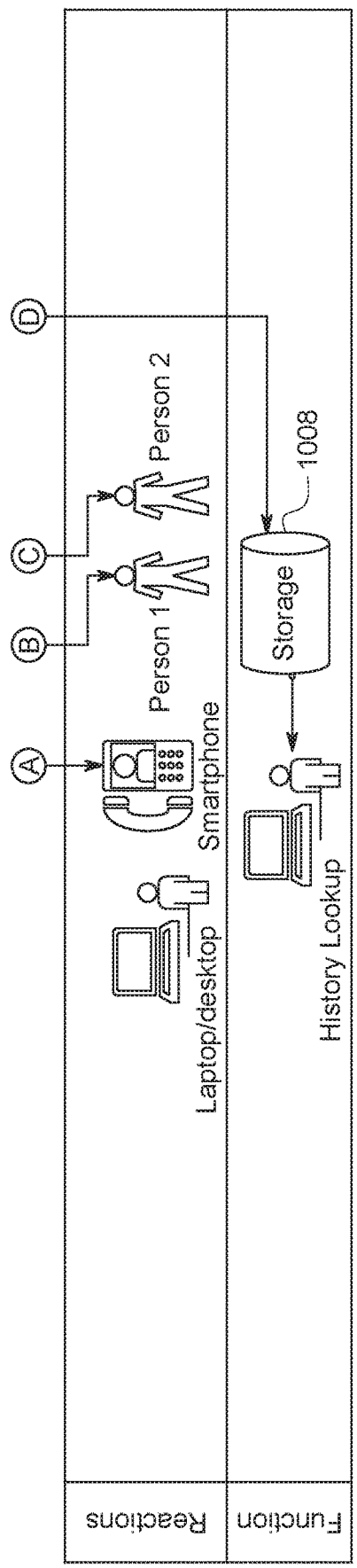

FIGS. 10A-10B show a flowchart of an embodiment wherein the system is configured to detect when a wearer of a badge 52 as discussed herein has stopped wearing it and to initiate designated responsive action. When a not-wearing condition has been detected, the system can treat this as an indication that the individual assigned to the badge is in an undetermined location which may or may not be near the location of the badge itself. A badge 52 is provided and contains both an electronic and mechanical accelerometer 66, 68 and communications capability to pass data to infrastructure units 40 as discussed above. Preferably electronic accelerometer 66 is an electronic 3-axis accelerometer that provides an acceleration magnitude and vector and the mechanical accelerometer 68 at least detects acceleration above a minimum value. The tag is configured to monitor the status or output of the accelerometers to detect a condition where the electronic accelerometer 66 outputs a motion vector less than a predefined threshold for greater than a predefined time period, such as less than 0.02 G for more than 210 seconds and where the mechanical accelerometer 68 does not trigger within the same period of time. If both conditions are detected (1002), an alert signal is generated by the tag and transmitted to be received by local infrastructure units 40 which can act on it or pass it upstream, e.g., to server 20. More sophisticated analysis can be performed on sensor data to filter out acceleration from environmental conditions, such as acceleration patterns indicative of motion of a vehicle, particularly when an inertial measurement unit is part of the sensor suite. The non-motion detection monitoring can be limited within the tag to specific time periods. Upstream filtering can also or alternatively be applied, for example, to filter out non-motion alerts from a tag that occur outside of designated time periods when the person assigned to the tag is supposed to be at work and wearing their badge.

Upstream processing, e.g., at the server level, is configured to send an alert to designated responders when an non-motion alert is received and determined to be acted on or not filtered out due, e.g., to it being outside normal work hours. (1006) The alert sent to responders can include data such as the type of alert (non-movement), the identity of the person assigned to the tag, and the last known location of the immobile tag and/or the last known location of the person. The alert and associated can also be logged in storage 1008 for later review. The alert message can be processed in a manner similar to that discussed above, where the recipient security staff is selected based on factors such as who is assigned to that area or who is closest. Alert accept, response checklists, and alert clear functionality can be implemented in a manner similar to that discussed above for panic button, fall, and other emergency alerts.

A variation of the method addressed in the context of FIG. 10 can be used to determine when a wearer of a badge is immobile and may needed attention.

In one embodiment, both conditions can be detected using the same sensor value thresholds. In another embodiment, provided the sensors are sufficiently accurate, the difference between lack of motion due to an unworn badge and lack of motion from an immobile person can be distinguished. When a person is wearing a badge, the badge will move slightly on a continuing basis. Even if the person is sitting still, there are slight involuntary movements from breathing and other activity that are not present when a badge is unworn.

As noted, the system implements a rule engine to process inputs and take responsive actions. Various methods exist to allow system users to define and modify rules. One configuration of various relevant user interfaces is described herein.

Dialog Creation Screen: Dialog templates are provided and pre-populated with basic elements. Pre-loaded templates can include a Simple notification screen, a 4 screen alert handling dialog comprising of, for example, an alert, confirmation, resolution and close-out screen, a 2 screen dialog comprising for example, an alert and an acknowledgement screen, and a 3 screen dialog consisting of, for example, an alert, resolution and close-out screen.

Users can select the dialog template they wish to use during the rule creation process. If there is a manual checklist in the dialog, the items in the checklist can be defined by addition, deletion or modification of the template items. If a location plan is in the dialog, the system can use as a default the display of the floor plan, site plan or road map showing where the alert was triggered. If a dropdown list is in the dialog, the items in the list can be altered by addition, deletion or modification of the template items. If a free text box is in the dialog, it can be required or not.

Preferably, all of the automatic reactions will show a checkbox next to them when the system confirms that the reaction command has been sent. Users are also preferably able to create their own their own custom dialogs. This can be done using simple drag and drop creation, similar to Visual Basic. For example, users create the size of the window. Then they can add in various elements such as camera view, room for checklists, add labels, pull in dynamic information from the alert by dropping set elements including pictures, date, time, alert type, floorplans/site plans/maps, drop lists (such as rule closure reasons), add buttons, create tabs and text boxes. Each button can trigger an event that is in turn processed by a rule anticipating that event's conditions and parameters.

A Camera View Element can be provided. The system can be integrated with a Closed Circuit Television (CCTV) camera and/or other monitoring system. Users can select which camera's view to show, with the default being the closest of the cameras having the alert location within its field of view. If two cameras have the location contained within their field of view, the user may switch between views. If the camera has pan/tilt/zoom capabilities, it may be controlled via an on-screen virtual joystick.

A branching methodology can be provided through checkbox selection. In manual checklists, the act of checking designated multiple choice boxes can be defined to cause the rule in effect for a given input to react accordingly. Rule responses can be flexibly assigned. For example, a panic button pressed input can be assigned to represent an emergency situation as noted above. The system does not initially know what type of alert this input represents and the same input ('panic' button press) could instead be defined as representing a different event, such as a user checking-in. If there is a fire, the user would select fire from the manual checklist and the rule established to react to a fire alert type of event would present a dialog screen with incident appropriate manual checklists and automatic reactions such as: Call Fire Dept. and Trigger evacuation alert.

Mobile device access: As noted, designated alert recipients and others can be provided with mobile devices configured to receive alert notifications and provide a user interface that allows receipt of an alert to be noted, acceptance of alert actions to take, checklist interact, etc.

The dialog screens operate with conventional mobile devices. For ease of access on a mobile device, when the system sends out a text message as a reaction to a rule the system can be configured to send an SMS link containing a token to the users. For logging and other purposes, each alert recipient will receive a unique token so that the system recognizes who clicked the link in response. (If a phone number, not a user, was added to the list of users that receives the SMS they will be directed to the login page). This will allow users who receive alerts to have a direct log-in free access to the dialog for the particular alert so they can more quickly respond.

Instead of a login-link, a mobile device app can be provided that can communicate with the main system, receive alerts and checklists from the system in the form of notifications, and present them to the user of the device as appropriate. Depending on the system configuration, the mobile device can be paired with a UID to more easily associate it with an individual user. Pairing techniques include using a camera on the mobile device to read a bar code symbol encoding the badge id, using RFID or near field communications.

An interface can also be provided to allow a user to manually trigger an alert. This can be useful if a sensor fails or is destroyed before the alert is issued. Users with the correct permissions can be allowed to manually trigger an alert from their dashboard.

Finally, the rules engine definition system can allow user to save reaction sets that comprises the dialog, the information within it and any reactions selected. When a user wishes to select a reaction, they can use a saved one as is, make changes to it and save it as a different reaction set or make changes, implement it and not save it. Any changes to a reaction list would preferably not change any pre-existing rules. Users can also be provided with pre-populated templates of reaction sets and dialogs as appropriate to their industry vertical, application type and/or department.

Various aspects of the systems and methods for safety and security have been disclosed and described herein. While the systems and methods have been primarily discussed in the context of safety and security systems, the integration about badged personnel with information about the objects they are interacting with (which have their own tags) combined with the multi-level rule based alert system can be used in other manners as well. For example, rules can be formulated to use the information collected from personnel badges as well as tags on other components and various sensors to optimize employee monitoring and improve employee utilization and productivity. Additional rules can be formulated to make use of information about who is interacting with what equipment or goods, where, when, and who else is nearby to ensure compliance with corporate best practices, and for improved tracking and monitoring of Inventory, Product Receiving, Shipping Validation. Loss Prevention, etc. Other modifications, additions and alterations may be made by one skilled in the art without departing from the spirit and scope of the inventions disclosed herein.

The invention claimed is:

1. A method for securing access to a space accessible through an electronically controlled barrier comprising the steps of:
   detecting using a reader having a respective read distance and positioned less than the respective read distance from a predefined area relative to the barrier a first set of security badges within a predefined area relative to the barrier, the first set of badges comprising a respective plurality of badges, each respective security badge having a unique badge ID and comprising a circuit therein permitting the badge to be remotely detected if within a read distance from a non-contact reader and for providing the reader with respective the badge ID, each badge ID being associated with security attributes of a respective individual to which it is assigned, the plurality of respective individuals to whom the first set of badges are assigned defining a first set of individuals, each respective security badge further comprising a wireless receiver circuit configured to respond to communication messages directed to the respective security badge and at least one of a speaker and a light;
   sending from the reader to the computer the respective badge IDs for each badge in the first set of badges;
   determining at the computer using at least one predefined rule from a set of predefined rules access rights to the space for individuals in the first set of individuals based on respective security attributes;
   in response to a determination that access to the space is permitted for all the individuals in the first set of individuals, sending a signal to disengage the barrier;
   detecting using the reader a second set of security badges within the predefined area, the second set of badges comprising a respective plurality of badges, the plurality of respective individuals to whom the second set of badges are assigned defining a second set of individuals, wherein at least some of the individuals in the second set of individuals are authorized to access the space;
   sending from the reader to the computer the respective badge IDs for each badge in the second set of badges;
   repeating the step of determining for individuals in the second set of individuals; and
   in response to a determination that access is not permitted for a particular individual in the second set, (i) sending an access denied message to the wireless receiver circuit in the security badge having a badge ID assigned to the particular individual, the access denied message causing at least one of an audible and visible output from the particular individual's security badge, and (ii) sending a signal to engage the barrier, wherein access to the space by any of the respective individuals in the second set of individuals is denied.

2. The method of claim 1, wherein the step of determining comprises:
   for each respective individual in the respective set of individuals (i) selecting from the set of predefined rules at least one individual rule to apply to the respective individual and (ii) applying the at least one individual rule to determine if access is permitted for the respective individual.

3. The method of claim 1, wherein the at least one predefined rule comprises a rule permitting access by first individual in a respective set of individuals and having a first security level only when the respective set of individuals also includes a second individual having a second level of access permission different from the first level of access permission.

4. The method of claim 1, further comprising the steps of after sending the signal to engage the barrier:
   detecting when the particular individual in the second set of individuals has moved beyond the predefined distance from the barrier, a third set of individuals comprising the second set of individuals less the particular individual;
   repeating the step of determining for individuals in the third set of individuals; and
   sending a signal to disengage the barrier to thereby permit access to the space by members of the third set of individuals in response to a determination that access to the space is permitted for all the individuals in the third set of individuals.

5. The method of claim 1, further comprising the steps of:
   detecting using a detector other than the reader to detect a number of detected individuals within the predetermined distance from the barrier;
   at least one of the at least one predefined rule being dependent on the number of detected individuals and the number of detected badges.

6. The method of claim 5, wherein the step of determining results in a determination that access is not permitted when the number of detected individuals is greater than the number of detected badges assigned to individuals having authorization to access the space.

7. The method of claim 5, wherein the detector comprises a video system comprising at least one video camera, the video system providing video of at least an area encompassing the predetermined distance from the barrier, the method further comprising the steps of analyzing the video from the video system to detect individuals in the video and calculating the number of detected individuals.

8. The method of claim 5, wherein the detector comprises a turnstile separate from the barrier.

9. The method of claim 1, further comprising in response to a determination that access is not permitted, the steps of:
   sending from the computer a first alert message to a first device indicating an access denied condition for the barrier, the first device being associated with a first security individual, the first security individual not one of the individuals in the respective set of individuals.

10. The method of claim 9, further comprising the step of sending from the computer a second alert message to a second device indicating the access denied condition for the barrier if an alert received message is not received at the computer from the first device within a predetermined period of time, the second device being associated with a second security individual, the second security individual not one of the individuals in the respective set of individuals and not the first security individual.

11. The method of claim 9, further comprising the step of identifying the first device based on proximity to the barrier.

12. The method of claim 9, further comprising the steps of:
   receiving at the computer an alert clear message from the first device; and
   sending from the computer a signal to disengage the barrier in response to the alert clear message.

13. The method of claim 1, wherein the barrier comprises a one of a gate, a turnstile, and a door.

14. A method for securing access to a space accessible through an electronically controlled barrier comprising the steps of:
   detecting using a reader having a respective read distance and positioned less than the respective read distance from a predefined area relative to the barrier a first set of security badges within a predefined area relative to the barrier, the first set of badges comprising a respective plurality of badges, each respective security badge having a unique badge ID and having a circuit therein permitting the badge to be remotely detected if within a read distance from a non-contact reader and for providing the reader with respective the badge ID, each badge ID being associated with security attributes of a respective individual to which it is assigned, the plurality of respective individuals to whom the first set of badges are assigned defining a first set of individuals;
   sending from the reader to the computer the respective badge IDs for each badge in the first set of badges;
   determining at the computer using at least one predefined rule from a set of predefined rules access rights to the space for individuals in the first set of individuals based on respective security attributes;
   in response to a determination that access to the space is permitted for all the individuals in the first set of individuals, sending a signal to disengage the barrier;
   detecting using the reader a second set of security badges within the predefined area, the second set of badges comprising a respective plurality of badges, the plurality of respective individuals to whom the second set of badges are assigned defining a second set of individuals, wherein at least some of the individuals in the second set of individuals are authorized to access the space;
   sending from the reader to the computer the respective badge IDs for each badge in the second set of badges;
   repeating the step of determining for individuals in the second set of individuals; and
   in response to a determination that access is not permitted for a particular individual in the second set, sending an access denied message to a receiver at the space and sending a signal to engage the barrier, wherein access to the space by any of the respective individuals in the second set of individuals is denied;
   wherein the space comprises a building floor accessible by an elevator, and engaging and disengaging the barrier comprises respectively preventing and allowing selection of the building floor as a destination for the elevator.

15. A method for securing access to a floor accessible through an elevator, the elevator having a door and a cab, the method comprising the steps of:
   detecting using a reader having a respective read distance and positioned less than the respective read distance from a predefined area relative to the elevator a first set of security badges, the first set of badges comprising a plurality of badges, each respective security badge having a unique badge ID and having a circuit therein permitting the badge to be remotely detected if within a read distance from a non-contact reader and for providing the reader with respective the badge ID, each badge ID being associated with security attributes of a respective individual to which it is assigned, the plurality of respective individuals to whom the first set of badges are assigned defining a first set of individuals;
   sending from the reader to the computer the respective badge IDs for each badge in the first set of badges;
   determining at the computer using at least one predefined rule from a set of predefined rules access rights to the floor for individuals in the first set of individuals based on respective security attributes;
   in response to a determination that access to the floor is permitted for all the individuals in the first set of individuals, sending a signal to permit operation of an elevator function required to provide access to the floor;
   detecting using the reader a second set of security badges within the predefined area, the second set of badges comprising a respective plurality of badges, the plurality of respective individuals to whom the second set of badges are assigned defining a second set of individuals, wherein at least some of the individuals in the second set of individuals are authorized to access the floor;
   sending from the reader to the computer the respective badge IDs for each badge in the second set of badges;
   repeating the step of determining for individuals in the second set of individuals; and
   in response to a determination that access is not permitted for a particular individual in the second set, sending an access denied message to a receiver in proximity to the elevator and sending a signal to prevent operation of the elevator function.

16. The method of claim 15, wherein the reader is in the elevator, the predefined area is the inside of the elevator cab, each respective set of individuals consists of individuals within the elevator cab, and the restricted elevator functionality comprises selection of at least one restricted floor as a destination for the elevator.

17. The method of claim 15, the access denied message initiating at least one of an audible and visible output from the receiver indicating a basis for the denial.

18. The method of claim 15, wherein the step of determining comprises:
   for each respective individual in the respective set of individuals (i) selecting from the set of predefined rules at least one individual rule to apply to the individual and (ii) applying the at least one individual rule to determine if access is permitted for the respective individual.

19. The method of claim 15, wherein the step of determining is executed in response to an attempted selection of a restricted floor as an elevator destination, wherein at least one of selection of and access to the restricted floor is permitted only in response to a detection that all of the individuals in the respective set of individuals are permitted access to the restricted floor.

20. The method of claim 15, wherein the second set of individuals comprises one of the first set of individuals with a further individual, and the first set of individuals with one fewer individual.

21. The method of claim 15, each respective security badge comprising a wireless receiver circuit configured to respond to communication messages directed to the respective security badge and at least one of a speaker and a light; the step of sending the access denied message comprising sending the message to the wireless receiver circuit in a security badge of a member of the second group of individuals.

22. The method of claim 21, wherein the access denied message is sent to the particular individual.

23. A system for securing access to a space comprising:
a barrier configured to be electronically engaged to selectively permit or deny access to the space;
a plurality of security badges each respective badge comprising at least one of a speaker and a light, and a wireless receiver circuit responsive to communication messages directed to the respective security badge;
a database accessible to a computer and containing data therein associating each badge ID with attributes of an individual to which the respective badge is assigned;
a reader having a respective read distance and positioned in the space less than the respective read distance from a predefined area relative to the barrier, the reader configured to read badge IDs from remotely readable security badges within the respective read distance and send the badge IDs to the computer;
the computer having a processor and configured via software to:
  receive a set of badge IDs from the at least one reader within a particular period of time; the set of badge IDs associated with a plurality of badges, each badge associated with an individual present in the predefined area;
  determine in response to the presence of a plurality of individuals in the predefined area access rights of the individuals to the space using the at least one predefined rule and information in the database for the plurality of individuals in the predefined area;
  disengage the barrier in response to a determination that access is permitted for all the individuals in the predefined area, wherein after the barrier is disengaged the first set of individuals is able to pass through the barrier; and
  engage the barrier in response to a determination that access is not permitted for a particular individual in the predefined area and send an access denied message to the wireless receiver circuit in the security badge having a badge ID assigned to the particular individual and configured to produce at least one of an audible and visible output in response to the access denied message.

24. The system of claim 23, the computer configured via software to determine access rights by for each respective individual in the respective set of individuals selecting an individual rule from the set of predefined rules and applying the selected individual rule to determine if access is permitted for the respective individual.

25. The system of claim 23, wherein the at least one predefined rule comprises a rule permitting access by a first individual in a respective set of individuals and having a first security level only when the respective set of individuals also includes a second individual having a second level of access permission different from the first level of access permission.

26. The system of claim 23, the computer further configured via software to, after sending the signal to engage the barrier:
  detect when the particular individual in the second set of individuals has moved beyond the predefined distance from the barrier, a third set of individuals comprising the second set of individuals less the particular individual;
  repeat the step of determining for individuals in the third set of individuals; and
  send a signal to disengage the barrier to thereby permit access to the space by members of the third set of individuals in response to a determination that access to the space is permitted for all the individuals in the third set of individuals.

27. The system of claim 23, the computer further configured via software to detect using a detector other than the reader a number of detected individuals within the predetermined distance from the barrier, wherein at least one predefined rule being dependent on the number of detected individuals and the number of detected badges.

28. The system of claim 27, wherein the detector comprises a video system comprising at least one video camera, the video system providing video of at least an area encompassing the predetermined distance from the barrier.

29. The system of claim 27, wherein the detector comprises a turnstile separate from the barrier.

30. The system of claim 23, the computer further configured via software to send a first alert message to a first device indicating an access denied condition for the barrier in response to a determination that access is not permitted, the first device being associated with a first person not in the respective set of individuals.

31. The system of claim 30, the computer further configured via software to send a second alert message to a second device indicating the access denied condition for the barrier in response to a condition indicating that an alert received message is not received at the computer from the first device within a predetermined period of time, the second device being associated with a second person, the second person not one of the individuals in the respective set of individuals and not the first individual.

32. The system of claim 30, the computer further configured via software to identify the first device based on proximity to the barrier.

33. The system of claim 30 the computer further configured via software to:
  receive an alert clear message from the first device; and
  send a signal to disengage the barrier in response to the alert clear message.

34. The system of claim 23, wherein the barrier comprises a one of a gate, a turnstile, and a door.

35. The system of claim 23, wherein the space comprises a building floor accessible by an elevator, wherein the computer is configured to disengage the barrier comprises respectively by preventing and allowing selection of the building floor as a destination for the elevator.

* * * * *